(12) United States Patent
Ross et al.

(10) Patent No.: US 11,868,250 B1
(45) Date of Patent: Jan. 9, 2024

(54) MEMORY DESIGN FOR A PROCESSOR

(71) Applicant: Groq, Inc., Mountain View, CA (US)

(72) Inventors: Jonathan Alexander Ross, Palo Alto, CA (US); Dennis Charles Abts, Eau Claire, WI (US); John Thompson, Minneapolis, MN (US); Gregory M. Thorson, Palo Alto, CA (US)

(73) Assignee: Groq, Inc., Mountain View, CA (US)

( * ) Notice: Subject to any disclaimer, the term of this patent is extended or adjusted under 35 U.S.C. 154(b) by 0 days.

(21) Appl. No.: 17/582,895

(22) Filed: Jan. 24, 2022

Related U.S. Application Data

(63) Continuation of application No. 16/526,966, filed on Jul. 30, 2019, now Pat. No. 11,263,129, which is a
(Continued)

(51) Int. Cl.
*G06F 12/02* (2006.01)
*G06F 3/06* (2006.01)
(Continued)

(52) U.S. Cl.
CPC .......... *G06F 12/0292* (2013.01); *G06F 3/061* (2013.01); *G06F 3/064* (2013.01);
(Continued)

(58) Field of Classification Search
CPC ...... G06F 12/0292; G06F 3/061; G06F 3/064; G06F 3/0673; G06F 9/3004;
(Continued)

(56) References Cited

U.S. PATENT DOCUMENTS 4,670,856 A 6/1987 Nishino et al.
5,058,001 A 10/1991 Li
(Continued)

FOREIGN PATENT DOCUMENTS

EP 0 940 012 B1 4/2002
EP 3 343 463 A1 7/2018
(Continued)

OTHER PUBLICATIONS

Abts, D. et al., "Think Fast: A Tensor Streaming Processor (TSP) for Accelerating Deep Learning Workloads," 2020 ACM/IEEE 47th Annual International Symposium on Computer Architecture (ISCA), Jun. 2020, pp. 145-158.
(Continued)

*Primary Examiner* — Edward J Dudek, Jr.
(74) *Attorney, Agent, or Firm* — Amin, Turocy & Watson, LLP

(57) ABSTRACT

A processor having a functional slice architecture is divided into a plurality of functional units ("tiles") organized into a plurality of slices. Each slice is configured to perform specific functions within the processor, which may include memory slices (MEM) for storing operand data, and arithmetic logic slices for performing operations on received operand data. The tiles of the processor are configured to stream operand data across a first dimension, and receive instructions across a second dimension orthogonal to the first dimension. The timing of data and instruction flows are configured such that corresponding data and instructions are received at each tile with a predetermined temporal relationship, allowing operand data to be transmitted between the slices of the processor without any accompanying metadata. Instead, each slice is able to determine what operations to perform on received data based upon the timing at which the data is received.

7 Claims, 17 Drawing Sheets

Related U.S. Application Data continuation of application No. 16/132,243, filed on Sep. 14, 2018, now Pat. No. 11,243,880.

(60) Provisional application No. 62/559,333, filed on Sep. 15, 2017.

(51) Int. Cl.
*G06F 9/30* (2018.01)
*G06F 13/16* (2006.01)
*G06F 9/38* (2018.01)

(52) U.S. Cl.
CPC .......... *G06F 3/0673* (2013.01); *G06F 9/3004* (2013.01); *G06F 9/3009* (2013.01); *G06F 9/30145* (2013.01); *G06F 9/3814* (2013.01); *G06F 13/1689* (2013.01); *G06F 2212/16* (2013.01)

(58) Field of Classification Search
CPC .. G06F 9/3009; G06F 9/30145; G06F 9/3814; G06F 13/1689
See application file for complete search history.

(56) References Cited

U.S. PATENT DOCUMENTS

| | | |
|---|---|---|
| 5,146,543 A | 9/1992 | Vassiliadis et al. |
| 5,179,702 A | 1/1993 | Spix et al. |
| 5,333,279 A | 7/1994 | Dunning |
| 5,379,440 A | 1/1995 | Kelly et al. |
| 5,488,729 A | 1/1996 | Vegesna et al. |
| 5,541,914 A | 7/1996 | Krishnamoorthy et al. |
| 5,590,083 A | 12/1996 | Pinkham et al. |
| 5,594,915 A | 1/1997 | Atalla |
| 5,794,062 A | 8/1998 | Baxter |
| 5,796,745 A | 8/1998 | Adams et al. |
| 5,842,034 A | 11/1998 | Bolstad et al. |
| 5,889,413 A | 3/1999 | Bauer |
| 5,898,881 A | 4/1999 | Miura et al. |
| 5,958,041 A | 9/1999 | Petolino, Jr. et al. |
| 6,181,164 B1 | 1/2001 | Miller |
| 6,243,808 B1 | 6/2001 | Wang |
| 6,279,057 B1 | 8/2001 | Westby |
| 6,298,162 B1 | 10/2001 | Sutha et al. |
| 6,681,316 B1 | 1/2004 | Clermidy et al. |
| 6,712,313 B2 | 3/2004 | Zoppitelli et al. |
| 6,988,181 B2 | 1/2006 | Saulsbury et al. |
| 7,015,913 B1 | 3/2006 | Lindholm et al. |
| 7,181,484 B2 | 2/2007 | Stribaek et al. |
| 7,236,995 B2 | 6/2007 | Hinds |
| 7,272,730 B1 | 9/2007 | Acquaviva et al. |
| 7,339,941 B2 | 3/2008 | Twomey |
| 7,421,559 B1 | 9/2008 | Yadav |
| 7,640,528 B1 | 12/2009 | Baeckler |
| 7,805,392 B1 | 9/2010 | Steele et al. |
| 7,861,060 B1 | 12/2010 | Nickolls et al. |
| 7,912,889 B1 | 3/2011 | Juffa et al. |
| 7,965,725 B2 | 6/2011 | Langevin et al. |
| 8,038,539 B2 | 10/2011 | Stamps et al. |
| 8,089,959 B2 | 1/2012 | Szymanski |
| 8,250,555 B1 | 8/2012 | Lee et al. |
| 8,286,172 B2 | 10/2012 | Chakradhar et al. |
| 8,345,540 B2 | 1/2013 | Rollins |
| 8,370,280 B2 | 2/2013 | Lin et al. |
| 8,407,167 B1 | 3/2013 | Abts et al. |
| 8,583,895 B2 | 11/2013 | Jacobs et al. |
| 8,655,937 B1 | 2/2014 | Vanderspek |
| 8,689,202 B1 | 4/2014 | Braun et al. |
| 8,830,993 B1 | 9/2014 | Dublin et al. |
| 8,850,262 B2 | 9/2014 | Cardinell et al. |
| 8,989,220 B2 | 3/2015 | Scrobohaci et al. |
| 9,009,660 B1 | 4/2015 | Griffin et al. |
| 9,146,747 B2 | 9/2015 | Moloney et al. |
| 9,388,862 B2 | 7/2016 | Lidak |
| 9,432,298 B1 | 8/2016 | Smith |
| 9,442,757 B2 | 9/2016 | Munshi et al. |
| 9,535,869 B2 | 1/2017 | Zheng |
| 9,639,490 B2 | 5/2017 | Blankenship et al. |
| 9,672,188 B2 | 6/2017 | Vorbach |
| 9,690,938 B1 | 6/2017 | Saxe et al. |
| 9,691,019 B1 | 6/2017 | Gulland et al. |
| 9,697,463 B2 | 7/2017 | Ross et al. |
| 9,710,265 B1 | 7/2017 | Temam et al. |
| 9,710,748 B2 | 7/2017 | Ross et al. |
| 9,723,317 B2 | 8/2017 | Hattori |
| 9,805,303 B2 | 10/2017 | Ross et al. |
| 10,167,800 B1 | 1/2019 | Chung et al. |
| 10,175,980 B2 | 1/2019 | Temam et al. |
| 10,235,735 B2 | 3/2019 | Venkatesh et al. |
| 10,320,390 B1 | 6/2019 | Ross |
| 10,489,680 B2 | 11/2019 | Aliabadi et al. |
| 10,521,488 B1 | 12/2019 | Ross et al. |
| 10,754,621 B2 | 8/2020 | Thorson |
| 10,776,110 B2 | 9/2020 | Pearce et al. |
| 10,936,569 B1 | 3/2021 | Baskaran et al. |
| 11,086,623 B2 | 8/2021 | Valentine et al. |
| 2001/0051860 A1 | 12/2001 | Copeland et al. |
| 2002/0060796 A1 | 5/2002 | Kanno et al. |
| 2002/0103961 A1 | 8/2002 | Ayukawa et al. |
| 2003/0095547 A1 | 5/2003 | Schofield |
| 2003/0206527 A1 | 11/2003 | Yim |
| 2004/0078555 A1 | 4/2004 | Porten et al. |
| 2004/0150543 A1 | 8/2004 | Wang et al. |
| 2004/0215679 A1 | 10/2004 | Beaumont |
| 2005/0125594 A1 | 6/2005 | Mattausch et al. |
| 2005/0278505 A1 | 12/2005 | Lim et al. |
| 2006/0161338 A1 | 7/2006 | Sohn et al. |
| 2006/0179207 A1 | 8/2006 | Eisen et al. |
| 2006/0190519 A1 | 8/2006 | Stribaek et al. |
| 2006/0225061 A1 | 10/2006 | Ludwig et al. |
| 2007/0124732 A1 | 5/2007 | Lia et al. |
| 2008/0126761 A1 | 5/2008 | Fontenot et al. |
| 2008/0209181 A1 | 8/2008 | Petkov et al. |
| 2008/0244135 A1 | 10/2008 | Akesson et al. |
| 2008/0301354 A1 | 12/2008 | Bekooij |
| 2009/0138534 A1 | 5/2009 | Lee et al. |
| 2009/0150621 A1 | 6/2009 | Lee |
| 2011/0022791 A1 | 1/2011 | Iyer et al. |
| 2011/0173258 A1 | 7/2011 | Arimilli et al. |
| 2011/0273459 A1 | 11/2011 | Letellier et al. |
| 2011/0320698 A1 | 12/2011 | Wang et al. |
| 2012/0072699 A1 | 3/2012 | Vorbach et al. |
| 2012/0127818 A1 | 5/2012 | Levy et al. |
| 2012/0159507 A1 | 6/2012 | Kwon et al. |
| 2012/0240185 A1 | 9/2012 | Kapoor et al. |
| 2012/0275545 A1 | 11/2012 | Utsunomiya et al. |
| 2012/0303933 A1 | 11/2012 | Manet et al. |
| 2012/0317065 A1 | 12/2012 | Bernstein et al. |
| 2012/0331197 A1 | 12/2012 | Campbell et al. |
| 2013/0010636 A1 | 1/2013 | Regula |
| 2013/0070588 A1 | 3/2013 | Steele et al. |
| 2013/0212277 A1 | 8/2013 | Bodik et al. |
| 2014/0047211 A1 | 2/2014 | Fleischer et al. |
| 2014/0115301 A1 | 4/2014 | Sanghai et al. |
| 2014/0181171 A1 | 6/2014 | Dourbal |
| 2014/0201755 A1 | 7/2014 | Munshi et al. |
| 2014/0281284 A1 | 9/2014 | Block et al. |
| 2015/0046678 A1* | 2/2015 | Moloney ............... G09G 5/397 712/29 |
| 2015/0378639 A1 | 12/2015 | Chien et al. |
| 2015/0379429 A1 | 12/2015 | Lee et al. |
| 2016/0062947 A1 | 3/2016 | Chetlur et al. |
| 2016/0246506 A1 | 8/2016 | Hebig et al. |
| 2016/0328158 A1 | 11/2016 | Bromberg et al. |
| 2016/0337484 A1 | 11/2016 | Tola |
| 2016/0342892 A1 | 11/2016 | Ross |
| 2016/0342893 A1 | 11/2016 | Ross et al. |
| 2016/0371093 A1 | 12/2016 | Chang |
| 2017/0032281 A1 | 2/2017 | Hsu |
| 2017/0063609 A1 | 3/2017 | Philip et al. |
| 2017/0085475 A1 | 3/2017 | Cheng et al. |
| 2017/0103316 A1 | 4/2017 | Ross et al. |
| 2017/0139677 A1 | 5/2017 | Lutz et al. |

(56) References Cited

U.S. PATENT DOCUMENTS

| | | | |
|---|---|---|---|
| 2017/0168990 | A1 | 6/2017 | Kernert et al. |
| 2017/0177352 | A1 | 6/2017 | Ould-Ahmed-Vall |
| 2017/0220719 | A1 | 8/2017 | Elrabaa et al. |
| 2017/0331881 | A1 | 11/2017 | Chandramouli et al. |
| 2017/0347109 | A1 | 11/2017 | Hendry et al. |
| 2017/0372202 | A1 | 12/2017 | Ginsburg et al. |
| 2018/0046903 | A1 | 2/2018 | Yao et al. |
| 2018/0046907 | A1 | 2/2018 | Ross et al. |
| 2018/0075338 | A1 | 3/2018 | Gokmen |
| 2018/0121196 | A1* | 5/2018 | Temam .................. G06F 9/3001 |
| 2018/0121796 | A1 | 5/2018 | Deisher et al. |
| 2018/0145850 | A1 | 5/2018 | Tam et al. |
| 2018/0157966 | A1 | 6/2018 | Henry et al. |
| 2018/0191537 | A1 | 7/2018 | Xiong et al. |
| 2018/0198730 | A1 | 7/2018 | Cook et al. |
| 2018/0247190 | A1 | 8/2018 | Chung et al. |
| 2018/0267932 | A1 | 9/2018 | Zhu et al. |
| 2018/0314671 | A1 | 11/2018 | Zhang et al. |
| 2018/0315157 | A1 | 11/2018 | Ould-Ahmed-Vall et al. |
| 2018/0329479 | A1 | 11/2018 | Meixner |
| 2018/0357019 | A1 | 12/2018 | Karr et al. |
| 2019/0089619 | A1 | 3/2019 | Yeager et al. |
| 2019/0206454 | A1 | 7/2019 | Ross et al. |
| 2019/0244080 | A1 | 8/2019 | Li et al. |
| 2019/0303147 | A1 | 10/2019 | Brewer |
| 2019/0311243 | A1 | 10/2019 | Whatmough et al. |
| 2019/0370645 | A1 | 12/2019 | Lee et al. |
| 2020/0117993 | A1 | 4/2020 | Martinez-Canales et al. |
| 2020/0192701 | A1 | 6/2020 | Horowitz et al. |
| 2020/0285605 | A1 | 9/2020 | Nam |

FOREIGN PATENT DOCUMENTS

| | | | |
|---|---|---|---|
| JP | 2017-062781 | A | 3/2017 |
| TW | 200926033 | A | 6/2009 |
| TW | 201706871 | A | 2/2017 |
| TW | 201706917 | A | 2/2017 |
| TW | 201732560 | A | 9/2017 |
| TW | 201804320 | A | 2/2018 |
| TW | 201810538 | A | 3/2018 |
| WO | 2016/186826 | A1 | 11/2016 |

OTHER PUBLICATIONS

Chang, W., "Computer Organization," CSC137, Sacramento State University Spring Semester, 2020, pp. 1-37.

De, A. et al., "Fast Integer Multiplication Using Modular Arithmetic," SIAM Journal on Computing, vol. 42, No. 2, Apr. 18, 2013, pp. 1-18.

Haidar, A. et al., "Harnessing GPU Tensor Cores for Fast FP16 Arithmetic to Speed up Mixed-Precision Iterative Refinement Solvers," SC18, Nov. 11-16, 2018, pp. 1-11.

Johnson, J., "Making floating point math highly efficient for AI hardware," Nov. 8, 2018, nine pages, [Online] [Retrieved on Jan. 20, 2021] Retrieved from the Internet <URL: https://engineering.fb.com/2018/11/08/ai-research/floating-point-math/>.

Jouppi, N.P. et al., "In-Datacenter Performance Analysis of a Tensor Processing Unit," ISCA '17, Jun. 2017, pp. 1-12.

Lopes, A.R. et al., "A Fused Hybrid Floating-Point and Fixed-Point Dot-product for FPGAs," International Symposium on Applied Reconfigurable Computing, Mar. 2010, pp. 157-168.

U.S. Office Action, U.S. Appl. No. 16/132,243, dated Dec. 31, 2019, 15 pages.

U.S. Office Action, U.S. Appl. No. 16/132,243, dated Aug. 10, 2020, 20 pages.

U.S. Office Action, U.S. Appl. No. 17/105,976, dated Sep. 30, 2021, 18 pages.

Wikipedia, "Complex instruction set computer," Last Edited Dec. 27, 2020, five pages, [Online] [Retrieved on Jan. 20, 2021] Retrieved from the internet <URL: https://en.wikipedia.org/wiki/Complex_instruction_set_computer>.

Wikipedia, "Harvard architecture," Last Edited Mar. 4, 2020, four pages, [Online] [Retrieved on Jan. 20, 2021] Retrieved from the internet <URL: https://en.wikipedia.org/wiki/Harvard_architecture>.

Wikipedia, "Instruction pipelining," Last Edited Jan. 16, 2021, 12 pages, [Online] [Retrieved on Jan. 20, 2021] Retrieved from the internet <URL: https://en.wikipedia.org/wiki/instruction_pipelining>.

Wikipedia, "Parallel Computing," Last Edited Jan. 8, 2021, eight pages, [Online] [Retrieved on Jan. 22, 2021] Retrieved from the internet <URL: https://en.wikipedia.org/wiki/parallel_computing>.

Wikipedia, "Reduced instruction set computer," Last Edited Jan. 14, 2021, ten pages, [Online] [Retrieved on Jan. 20, 2021] Retrieved from the internet <URL: https://en.wikipedia.org/wiki/Reduced_instruction_set_computer>.

Wikipedia, "SIMD," Last Edited Dec. 18, 2020, nine pages, [Online] [Retrieved on Jan. 22, 2021] Retrieved from the internet <URL: https://en.wikipedia.org/wiki/SIMD>.

Wikipedia, "Tensor," Last Edited Jan. 10, 2021, 20 pages, [Online] [Retrieved on Jan. 15, 2021] Retrieved from the internet <URL: https://en.wikipedia.org/wiki/Tensor>.

Groq, "Groq Announces World's First Architecture Capable of 1,000,000,000,000,000 Operations per Second on a Single Chip," Nov. 14, 2019, three pages, Retrieved from the Internet <URL:https://www.prnewswire.com/news-releases/groq-announces-worldsfirstarchitecture-capable-of-1-000-000-000-000-000-operations-per-second-on-a-single-chip-300958743.html>.

Groq, Inc. "The Challenge of Batch Size 1: Groq Adds Responsiveness to Inference Performance" White Paper, Apr. 2020, pp. 1-7.

Hu, Y. et al. "On-chip Instruction Generation for Cross-Layer CNN Accelerator on FPGA," *IEEE Computer Society Annual Symposium on VLSI*, Jul. 2019, pp. 7-12.

Indian Patent Office, Office Action, Indian Patent Application No. 202247031762, dated Sep. 20, 2022, 6 Pages.

Lethin, R.A. et al. "How VLIW Almost Disappeared-and Then Proliferated," *IEEE Solid-State Circuits Magazine*, vol. 1, No. 3, Aug. 7, 2009, pp. 15-23.

Mercaldi, M. et al. "Instruction Scheduling for a Tiled Dataflow Architecture," *ACM SIGARCH Computer Architecture News*, vol. 34, No. 5, Oct. 20, 2006, pp. 141-150.

PCT International Search Report and Written Opinion, PCT Application No. PCT/US20/62241, dated Feb. 11, 2021, 20 pages.

Sotiropoulos, A. et al. "Enhancing the Performance of Tiled Loop Execution onto Clusters Using Memory Mapped Network Interfaces and Pipelined Schedules," *ipdps*, Apr. 15, 2002, pp. 1-9.

Southard, D. "Tensor Streaming Architecture Delivers Unmatched Performance for Compute-Intensive Workloads" Groq White Paper, Nov. 18, 2019, pp. 1-7.

U.S. Office Action, U.S. Appl. No. 17/684,337, dated Feb. 14, 2023, 14 pages.

U.S. Office Action, U.S. Appl. No. 17/104,465, dated Nov. 12, 2021, 18 pages.

U.S. Office Action, U.S. Appl. No. 16/951,938, dated Aug. 17, 2021, 12 pages.

Wang, X. et al. "Hera: A Reconfigurable and Mixed-Mode Parallel Computing Engine on Platform FPGAS," Jan. 2004, pp. 1-6.

International Search Report and Written Opinion receiived for International PCT Application Serial No. PCT/US2019/062303 dated Mar. 25, 2020, 14 pages.

Non Final Office Action received for U.S. Appl. No. 16/686,864 dated Jun. 1, 2021, 22 pages.

Non Final Office Action received for U.S. Appl. No. 16/686,866 dated Sep. 23, 2021, 25 pages.

Non Final Office Action received for U.S. Appl. No. 16/686,858 dated Jan. 25, 2022, 32 pages.

Non Final Office Action received for U.S. Appl. No. 17/519,425 dated Jan. 26, 2023, 17 pages.

Bustamam et al. "Fast Parallel Markov Clustering in Bioinformatics Using Massively Parallel Computing on GPU with CUDA And ELLPACK-R Sparse Format," IEEE/ACM Transactions on Computational Biology and Bioinformatics, vol. 9, No. 3, Mar. 22, 2012, pp. 679-692.

(56) References Cited

OTHER PUBLICATIONS

Bouaziz et al., "Parallel Long Short-Term Memory for Multi-Stream Classification," IEEE Spoken Language Technology Workshop, Dec. 13-16, 2016, pp. 218-223.
Fuchs et al., "Parallel Vectors Criteria for Unsteady Flow Vortices," IEEE Transactions on Visualization and Computer Graphics, vol. 14, No. 3, May-Jun. 2008, pp. 615-626.
Gelder et al., "Using PVsolve to Analyze and Locate Positions of Parallel Vectors," IEEE Transactions on Visualization and Computer Graphics, vol. 15, No. 4, Jul.-Aug. 2009, pp. 682-695.
Gil-Cacho et al., "Nonlinear Acoustic Echo Cancellation Based On A Parallel-Cascade Kernel Affine Projection Algorithm," IEEE International Conference on Acoustics, Speech and Signal Processing, Mar. 25-30, 2012, pp. 33-36.
Japan Patent Office, Office Action, Japanese Patent Application No. 2021-527941 dated Dec. 20, 2022, 11 pages (Including English Translation).
Request for the Submission of an Opinion received for Korean Patent Application Serial No. 10-2021-7012323 dated Aug. 29, 2022, 10 pages (Including English Translation).
Rodrigues et al., "SIMDization of Small Tensor Multiplication Kernels for Wide SIMD Vector Processors," 4th Workshop on Programming Models for SIMDNector Processing, Feb. 2018, pp. 1-8.
Suh et al., "A Performance Analysis of PIM, Stream Processing, and Tiled Processing on Memory-Intensive Signal Processing Kernels," 30th Annual International Symposium on Computer Architecture, Jun. 2003, pp. 410-421.
Office Action received for Taiwan Patent Application Serial No. 108142039 dated Jan. 3, 2023, 28 pages (Including English Translation).
Non Final Office Action received for U.S. Appl. No. 16/686,870 dated May 27, 2022, 61 pages.
Final Office Action received for U.S. Appl. No. 16/686,858 dated Jun. 29, 2022, 23 pages.
Notice of Allowance received for U.S. Appl. No. 17/519,425 dated Mar. 15, 2023, 25 pages.
Notice of Allowance received for U.S. Appl. No. 16/686,858 dated Aug. 3, 2022, 25 pages.
Notice of Allowance received for U.S. Appl. No. 16/686,864 dated Jul. 29, 2021, 14 pages.
Notice of Allowance received for U.S. Appl. No. 16/686,866 dated Dec. 7, 2021, 13 pages.
Notice of Allowance received for U.S. Appl. No. 16/686,870 dated Aug. 17, 2022, 54 pages.
Notice of Allowance received for U.S. Appl. No. 16/686,870 dated Aug. 24, 2022, 5 pages.
Notice of Allowance received for U.S. Appl. No. 16/686,870 dated Oct. 25, 2022, 5 pages.
Non Final Office Action received for U.S. Appl. No. 17/203,214 dated Mar. 15, 2023, 52 pages.
Dey et al., "Fast Integer Multiplication Using Modular Arithmetic", The proceedings of the 40th ACM Symposium on Theory of Computing, 2008.
Narksith et al., "Switch adjusting on hierarchical shuffle-exchange networks for all-to-all personalized exchange," The 2013 10th International Joint Conference on Computer Science and Software Engineering, May 29-31, 2013, pp. 121-126.
International Search Report and Written Opinion received for PCT Application Serial No. PCT/US2019/048568 dated Nov. 20, 2019, 7 pages.
International Search Report and Written Opinion received for PCT Application Serial No. PCT/US2019/068767 dated Mar. 17, 2020, 10 pages.
International Search Report and Written Opinion received for PCT Application Serial No. PCT/US2019/022357 dated Nov. 7, 2019, 10 pages.
Ren et al., "Permutation Capability of Optical Cantor Network", IEEE, Dec. 2007, pp. 398-403.
Taiwanese Intellectual Property Office, Office Action, TW Patent Application No. 108109969, dated Feb. 14, 2020, 12 pages (Including English Translation).
Non Final Office Action received for U.S. Appl. No. 16/117,763 dated Oct. 24, 2019, 17 pages.
Waksman, A. "A Permutation Network," Journal of the Association for Computing Machinery, vol. 15, No. 1, Jan. 1968, pp. 159-163.
Yang et al., "Fast subword permutation instructions based on butterfly network," Proceedings of SPIE, Media Processor 2000, Jan. 27-28, 2000, pp. 80-86.
Office Action received for Taiwan Patent Application Serial No. 108131334 dated Jun. 30, 2022, 6 pages (Including English Translation).
Non Final Office Action received for U.S. Appl. No. 16/932,632 dated May 19, 2021, 24 pages.
Non Final Office Action received for U.S. Appl. No. 16/928,958 dated Sep. 21, 2021, 19 pages.
Non Final Office Action received for U.S. Appl. No. 16/928,958 dated Jul. 23, 2021, 19 pages.
Final Office Action received for U.S. Appl. No. 16/928,958 dated Jun. 4, 2021, 18 pages.
Non Final Office Action received for U.S. Appl. No. 16/928,958 dated Apr. 12, 2021, 27 pages.
Non Final Office Action received for U.S. Appl. No. 16/526,936 dated Jul. 1, 2022, 27 pages.
Non Final Office Action received for U.S. Appl. No. 16/277,817 dated May 20, 2020, 37 pages.
Final Office Action received for U.S. Appl. No. 16/243,768 dated Apr. 26, 2021, 26 pages.
Non Final Office Action received for U.S. Appl. No. 16/243,768 dated Sep. 1, 2020, 22 pages.
Non Final Office Action received for U.S. Appl. No. 16/132,196 dated Dec. 8, 2020, 30 pages.
Final Office Action received for U.S. Appl. No. 16/132,196 dated May 20, 2020, 38 pages.
Non Final Office Action received for U.S. Appl. No. 16/132,196 dated Dec. 11, 2019, 29 pages.
Non Final Office Action received for U.S. Appl. No. 17/397,158 dated Oct. 6, 2022, 47 pages.
Non Final Office Action received for U.S. Appl. No. 17/528,609 dated Jan. 4, 2023, 26 pages.
Non Final Office Action received for U.S. Appl. No. 17/532,694 dated Jan. 19, 2023, 27 pages.
Notice of Allowance received for U.S. Appl. No. 16/132,196 dated Apr. 30, 2021, 35 pages.
Notice of Allowance received for U.S. Appl. No. 17/397,158 dated Mar. 22, 2023, 39 pages.
Notice of Allowance received for U.S. Appl. No. 16/243,768 dated May 21, 2021, 30 pages.
Notice of Allowance received for U.S. Appl. No. 16/132,102 dated Jul. 1, 2021, 26 pages.
Notice of Allowance received for U.S. Appl. No. 16/526,916 dated Sep. 20, 2021, 28 pages.
Notice of Allowance received for U.S. Appl. No. 16/526,922 dated Aug. 27, 2021, 25 pages.
Notice of Allowance received for U.S. Appl. No. 16/526,936 dated Oct. 13, 2022, 23 pages.
Notice of Allowance received for U.S. Appl. No. 17/528,609 dated Jan. 30, 2023, 27 pages.
Notice of Allowance received for U.S. Appl. No. 17/532,694 dated Feb. 10, 2023, 27 pages.
Notice of Allowance received for U.S. Appl. No. 16/932,632 dated Sep. 9, 2021, 25 pages.
Notice of Allowance received for U.S. Appl. No. 16/277,817 dated Sep. 30, 2020, 34 pages.
Notice of Allowance received for U.S. Appl. No. 16/928,958 dated Dec. 17, 2021, 16 pages.
Notice of Allowance received for U.S. Appl. No. 16/117,763 dated Apr. 14, 2020, 17 pages.
Notice of Allowance received for U.S. Appl. No. 16/117,763 dated Jun. 8, 2020, 5 pages.
Notice of Intent to Grant for European Patent Application Serial No. 19765954.3 dated Feb. 17, 2023, 41 pages.

(56) References Cited

OTHER PUBLICATIONS

Notice of Intent to Grant for European Patent Application No. 19765954.3 dated Oct. 17, 2022, 41 pages.
Communication Pursuant to Article 94(3) EPC received for European Patent Application Serial No. 19765954.3 dated Feb. 23, 2022, 8 pages.
Notice of Allowance received for U.S. Appl. No. 17/684,337, dated Apr. 13, 2023, 50 pages.
Sotiropoulos et al., Enhancing the Performance of Tiled Loop Execution on to Clusters using Memory Mapped NetworkInterfaces and Pipelined Schedules, 2002, citation 1 page.
Notice of Allowance received for U.S. Appl. No. 17/697,201 dated Feb. 23, 2023, 37 pages.
Notice of Allowance received for U.S. Appl. No. 17/697,201 dated Mar. 7, 2023, 4 pages.
Non Final Office Action received for U.S. Appl. No. 16/132,243 dated Dec. 31, 2019, 28 pages.
Notice of Allowance received for U.S. Appl. No. 16/132,243 dated Jun. 22, 2021, 47 pages.
Notice of Allowance received for U.S. Appl. No. 16/132,243 dated Sep. 30, 2021, 42 pages.
Notice of Allowance received for U.S. Appl. No. 16/132,243 dated Dec. 15, 2021, 19 pages.
Notice of Allowance received for U.S. Appl. No. 16/526,966 dated Feb. 8, 2021, 45 pages.
Notice of Allowance received for U.S. Appl. No. 16/526,966 dated Jun. 21, 2021, 28 pages.
Notice of Allowance received for U.S. Appl. No. 16/526,966 dated Oct. 15, 2021, 30 pages.
Notice of Allowance received for U.S. Appl. No. 16/526,966 dated Jan. 5, 2022, 18 pages.
Communication Pursuant to Article 94(3) EPC received for European Patent Application Serial No. 19827878.0 dated May 22, 2023, 5 pages.
Decision to Grant received for Japanese Patent Application Serial No. 2021-527941 dated Mar. 28, 2023, 5 pages (Including English Translation).
Written Decision on Registration received for Korean Patent Application Serial No. KR20217012323 dated Apr. 24, 2023, 12 pages (Including English Translation).
Final Office Action received for U.S. Appl. No. 16/951,938 dated Feb. 4, 2022, 23 pages.
Notice of Allowance received for U.S. Appl. No. 16/951,938 dated Dec. 23, 2022, 33 pages.
Notice of Allowance received for U.S. Appl. No. 17/105,976, dated Feb. 3, 2022, 28 pages.
Decision to Grant a Patent received for European Patent Application Serial No. 19765954.3 dated Jun. 29, 2023, 2 pages.
Office Action received for Taiwan Patent Application Serial No. 11220743060 dated Aug. 1, 2023, 4 pages.
Office Action received for Chinese Patent Application Serial No. 201880006508.9 dated Jul. 19, 2023, 7 pages.
Notice of Allowance received for U.S. Appl. No. 17/203,214 dated Jul. 19, 2023, 50 pages.
Non-Final office action received for U.S. Appl. No. 18/083,388 dated Jul. 14, 2023, 50 pages.
Notice of Allowance received for U.S. Appl. No. 17/684,337 dated Jul. 3, 2023, 91 pages.
Notice of Allowance received for U.S. Appl. No. 17/519,425 dated Jun. 20, 2023, 60 pages.
Notice of Allowance received for U.S. Appl. No. 17/397,158 dated Aug. 23, 2023, 78 pages.
Notice of Allowance received for U.S. Appl. No. 16/951,938 dated Sep. 5, 2023, 81 pages.
Notice of Allowance received for U.S. Appl. No. 18/083,388 dated Aug. 31, 2023, 25 pages.
Notice of Allowance received for U.S. Appl. No. 17/582,895 dated Aug. 16, 2023, 40 pages.
Notice of Allowance received for U.S. Appl. No. 17/203,214 dated Aug. 16, 2023, 5 pages.
Notice of Allowance received for U.S. Appl. No. 17/397,158 dated Oct. 2, 2023, 10 pages.
Notice fo Allowance received for U.S. Appl. No. 16/951,938 dated Sep. 27, 2023, 102 pages.
Notice of Allowance received for U.S. Appl. No. 18/083,388 dated Oct. 4, 2023, 10 pages.
First Office Action received for Chinese Patent Application Serial No. 201980074328.9 dated Aug. 14, 2023, 6 pages (Including English Translation).

\* cited by examiner

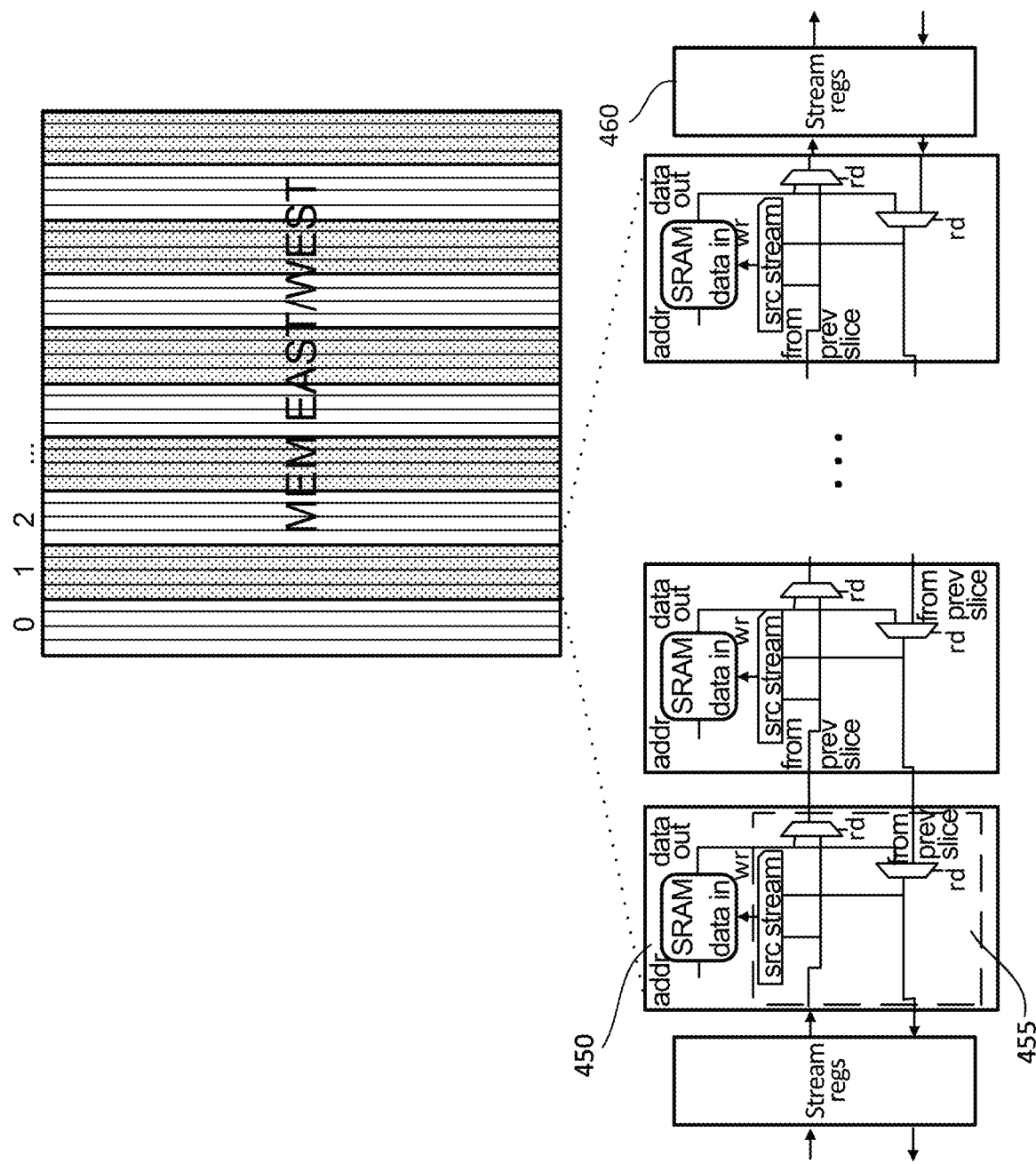

MEMORY DESIGN FOR A PROCESSOR

CROSS-REFERENCE TO RELATED APPLICATIONS

This application is a continuation of co-pending U.S. application Ser. No. 16/526,966 filed Jul. 30, 2019, which is a continuation of co-pending U.S. application Ser. No. 16/132,243, filed Sep. 14, 2018, which claims priority under 35 U.S.C. § 119(e) to U.S. Provisional Patent Application Ser. No. 62/559,333, filed on Sep. 15, 2017, all of which are hereby incorporated by reference in its entirety.

TECHNICAL FIELD

The present disclosure generally relates to memory design for a processor.

BACKGROUND

In a processor, there are many challenges that decrease the efficiency of a processor. For example, instructions need to be decoded and data for the instructions needs to be retrieved from cache or memory. The decoding of instructions and retrieving of data adds latency to the overall execution of the instructions.

SUMMARY

Embodiments are directed to a processor having a functional slice architecture. In some embodiments, the processor is configured to process a machine learning model. The processor is divided into a plurality of functional units ("tiles") organized into a plurality of slices. Each slice is configured to perform specific functions within the processor, which may include memory slices (MEM) for storing operand data, arithmetic logic slices for performing operations on received operand data (e.g., vector processing, matrix manipulation), and/or the like. The tiles of the processor are configured to stream operand data across a first dimension, and receive instructions across a second dimension that is orthogonal to the first dimension. The compiler for the processor is aware of the hardware configuration of the processor, and configures the timing of data and instruction flows such that corresponding data and instructions are received at each tile with a predetermined temporal relationship. As such, operand data can be transmitted between the slices of the processor without any accompanying metadata. Instead, each slice is able to determine what operations to perform on received data based upon the timing at which the data is received.

In some embodiments, the processor comprises a memory system having a plurality of memory tiles organized into a plurality of memory slices, each tile configured to store operand data to be operated on by one or more functional slices of the processor. Each memory slice comprises a set of memory tiles arranged along a first dimension, and is controlled by a respective instruction control unit. The instruction control circuit for each memory slice is located at one end of the memory slice in the first dimension, and is configured to read instructions from a respective instruction buffer to provide the instructions to the memory tiles of the memory slice across the first dimension.

The memory system further comprises a plurality of data lanes connecting respective memory tiles of the plurality of slices and the one or more functional slices, the one or more data lanes allowing transmission of operand data between the respective tiles of the connected memory slices and functional slices in a direction along a second dimension. In some embodiments, a plurality of data registers are located along each data lane which serve to transport data across the data lane between different slices of the processor. The data registers may further serve as hardware structures for defining an architecture-visible state for use by the compiler for communicating operand data between the slices of the processor.

A memory tile of the plurality of memory tiles processes an instruction command by receiving, during a first cycle, a command from the instruction buffer, receiving operand data through a data lane of the plurality of data lanes connected to the memory tile during a second cycle having a predetermined relationship with the first cycle, and processing the received command using the data received through the data lane or data retrieved from a memory address within the memory tile specified by the received command. By receiving instructions and operand data in accordance with a predetermined timing, the operand data may be received without any metadata indicating the operation to be performed on the data. Instead, each tile may determine how to operate on the data based upon the timing at which the data is received relative to received instructions.

BRIEF DESCRIPTION OF THE DRAWINGS

FIG. 4B is a diagram illustrating slice organization within a hemisphere, in accordance with some embodiments.

Figure 1A:
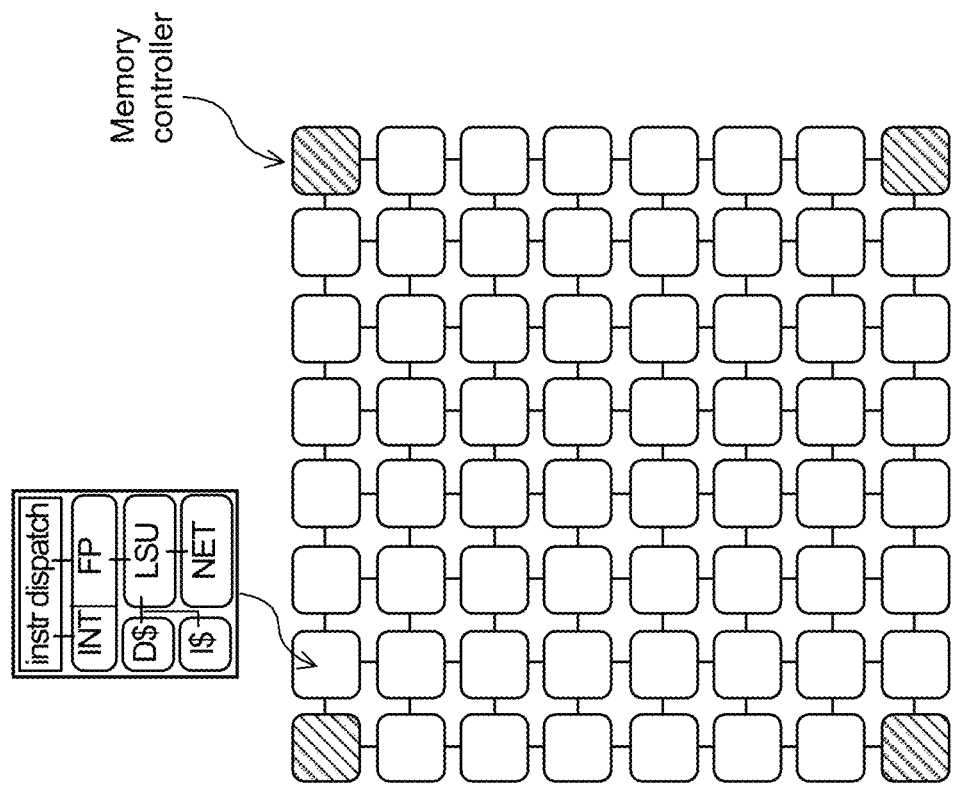
FIG. 1A illustrates a diagram of an example many-core tiled processor microarchitecture.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments are directed to a processor having a functional slicing architecture. In some embodiments, the processor may comprise a tensor streaming processor (TSP) having a functional slicing architecture, which may be used for hardware-accelerated machine learning (ML) applications.

The processor architecture comprises a plurality of "tiles," each tile corresponding to a functional unit within the processor. The on-chip memory and network-on-chip (NoC) of the processor architecture are fused to provide both storage of operands and results, and may act as a conduit for transferring operand and/or result data to/from the functional units of the processor. The tiles of the processor are divided between different functionalities (e.g., memory, arithmetic operation, etc.), and are organized as slices which operate on multidimensional data (e.g., tensors). For example, each slice is composed from tiles which are abutted, both horizontal and vertically, to form the functional slice. The number of tiles, and computation granularity of each tile may be selected to take advantage of the underlying technology on which it is built. Taken together, the number of tiles (N) and the SRAM word granularity (M) yields the vector length (VL) of the machine.

In some embodiments, each functional slice of the processor functions independently, and receives instructions from an instruction control unit (ICU). The ICU may pass instructions to a first tile of the slice, which are then propagated in a first direction along the slice to the remaining tiles of the slice. On the other hand, data operands for storage and/or processing may be passed between different slices of the processor, in a second direction that is perpendicular to the first direction. As such, the data flow and the instruction flow of the processor are separated from each other and flow in perpendicular directions.

In some embodiments, a compiler for the processor is aware of the hardware configuration of the processor, and synchronizes the timing of data and instruction flows such that corresponding data and instructions are received at each tile with a predetermined temporal relationship (e.g., during the same cycle, separated by a predetermined delay, etc.). In some embodiments, the predetermined temporal relationship may be based upon the hardware of the processor, a type of instruction, and/or the like. Because the temporal relationship between when data and instructions are received is known, the operand data received by a tile may not need to include any metadata indicating what the data is to be used for. Instead, each tile may receive instructions, and based upon the predetermined timing, perform the instruction on the corresponding data. This may allow for the data and instructions to flow through the processor more efficiently.

Architectural Overview

FIG. 1A illustrates a diagram of an example many-core tiled processor microarchitecture. As illustrated in FIG. 1A, each "tile" of the processor architecture is a processing element tied together using a network-on-chip (NoC). For example, each tile may have an integer (INT) and floating-point (FP) unit as well as load-store unit (LSU) to interface with the memory hierarchy (D$ and I$) and a network (NET) interface for communication with other tiles of the architecture.

Figure 1B:
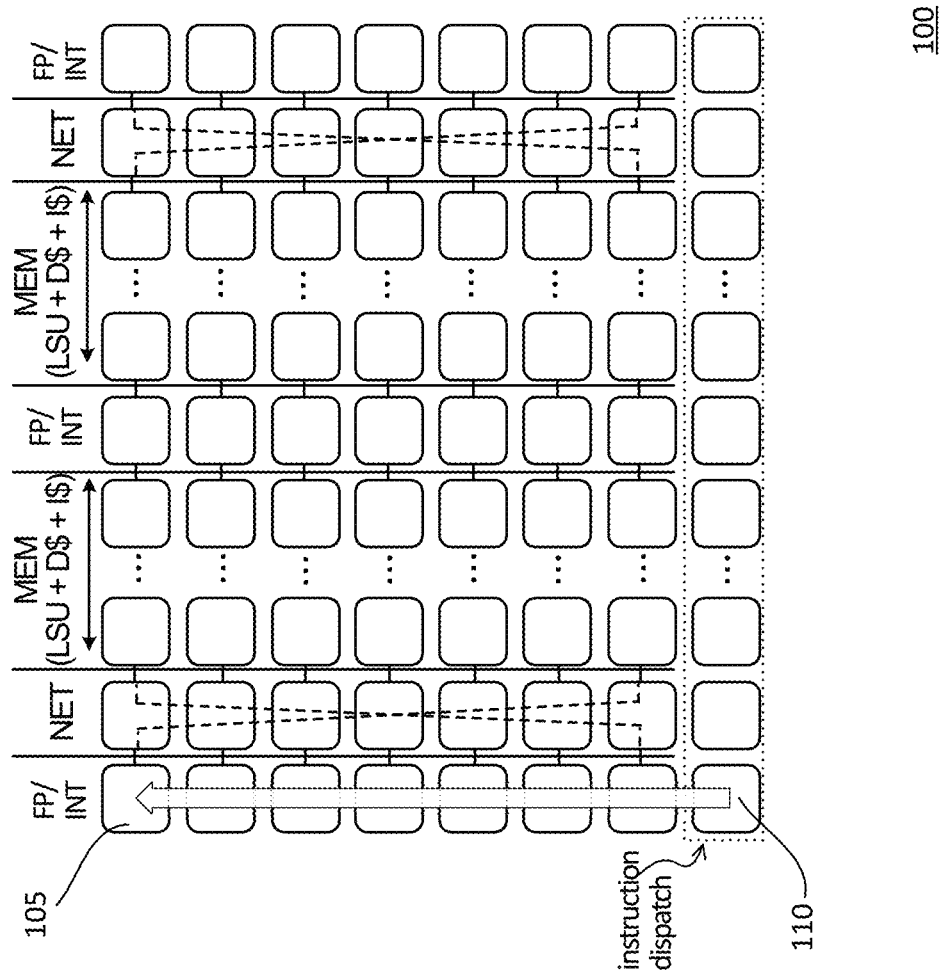
FIG. 1B illustrates a processor having a functional slice architecture, in accordance with some embodiments.

FIG. 1B illustrates a processor having a functional slice architecture, in accordance with some embodiments. The processor may located on an application specific integrated circuit (ASIC), and FIG. 1B may represent the layout of the ASIC. In some embodiments, the processor is a co-processor that is designed to execute instructions for a predictive model. The predictive model is any model that is configured to make a prediction from input data. The predictive model can use a classifier to make a classification prediction. In one specific embodiment, the predictive model is a machine learning model such as a tensor flow model, and the processor 100 is a TSP.

In comparison to the processor illustrated in FIG. 1A, the processor 100 illustrated in FIG. 1B employs a different microarchitecture which disaggregates the functional units shown in each tile in FIG. 1A. Instead, the functional tiles of the processor 100 are aggregated into a plurality of functional process units (hereafter referred to as "slices") 105, each corresponding to a particular function type (e.g., FP/INT, NET, MEM). For example, as illustrated in FIG. 1, each slice may correspond to a column of functional tiles extending in a north-south direction. In addition, the processor also includes communication lanes to carry data between the tiles of different slices, each running horizontally in an east-west direction (not shown). Each communication lane may be connected to each of the slices 105 of the processor 100.

The slices 105 of the processor 100 may each correspond to a different function, and may include arithmetic logic slices (e.g., FP/INT), lane switching slices (e.g., NET), and memory slices (e.g., MEM). The arithmetic logic units execute one or more arithmetic and/or logic operations on the data received via the communication lanes to generate output data. Examples of arithmetic logic units are matrix multiplication units and vector multiplication units.

The memory slices include memory cells that store data. The memory slices can provide the data to other slices through the communication lanes. The memory slices can also receive data from other slices through the communication lanes.

The lane switching slices can configurably route data from one communication lane to any other communication lane. For example, data from a first lane can be provided to a second lane through a lane switching slice. In some embodiments, the lane switching slice can be implemented as a crossbar switch.

Each slice 105 also includes its own instruction queue (not shown) that stores instructions, and an instruction control unit (ICU) 110 to control execution of the instructions. The instructions in a given instruction queue are executed only by tiles in its associated functional slice and are not executed by the other slice of the processor.

Figure 2A:
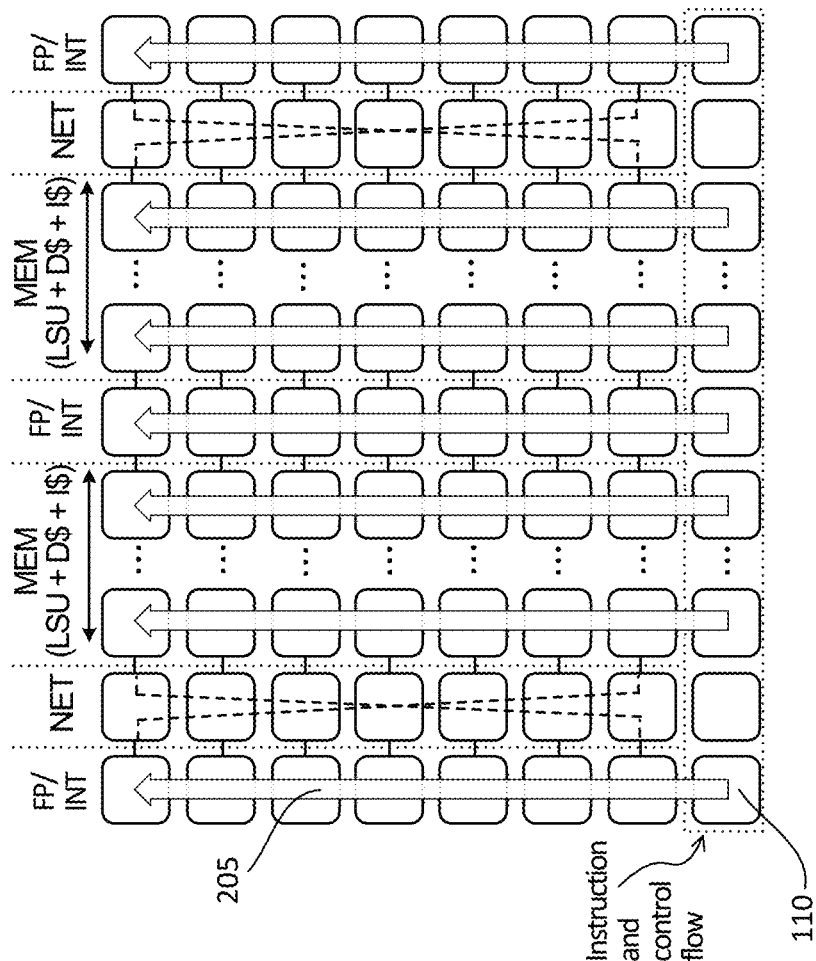
FIG. 2A illustrates the flow of instructions within the processor architecture, in accordance with some embodiments.
Figure 2B:
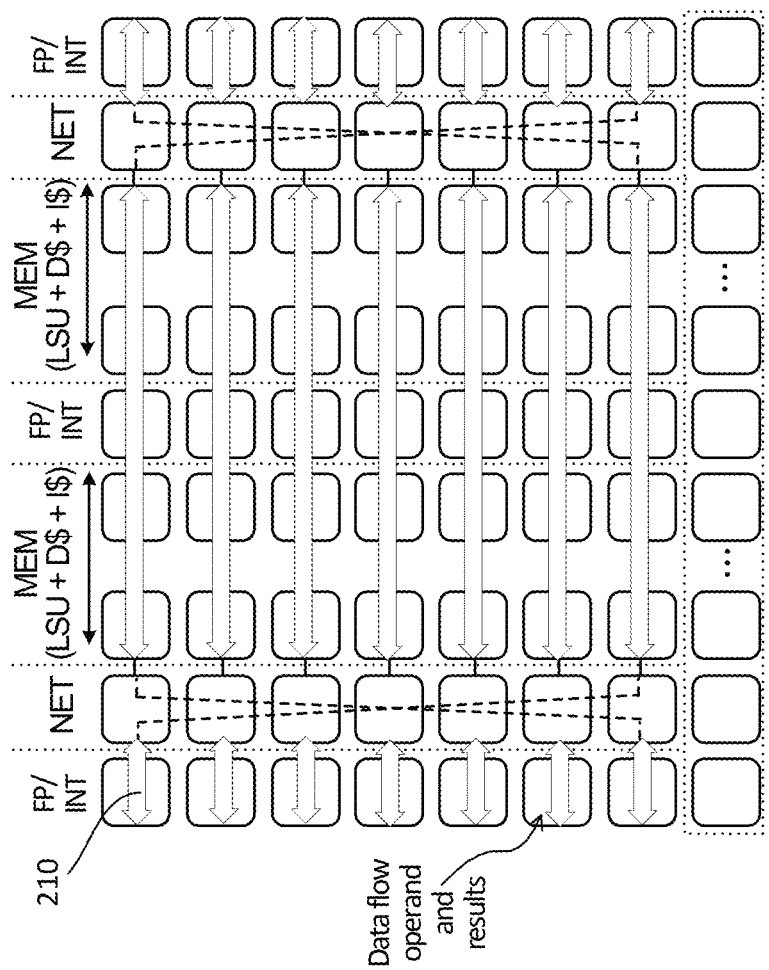
FIG. 2B illustrates data flow within the processor architecture, in accordance in some embodiments.

By arranging the tiles of the processor 100 into different functional slices 105, the on-chip instruction and control flow of the processor 100 can be decoupled from the data flow. For example, FIG. 2A illustrates the flow of instructions within the processor architecture, in accordance with some embodiments. FIG. 2B illustrates data flow within the processor architecture, in accordance in some embodiments. As illustrated in FIGS. 2A and 2B, the instructions and control flow 205 flows in a first direction across the tiles of the processor 100 (e.g., north-south, along the length of the functional slices), while the data flows 210 flow in a second direction across the tiles of the processor 100 (e.g., east-west, across the functional slices) that is perpendicular to the first direction.

In some embodiments, different functional slices of the processor may correspond to MEM (memory), VXM (vector execution module), MXM (matrix execution module), NIM (numerical interpretation module), and SXM (switching and permutation module). Each slice may consist of N tiles that are all controlled by the same instruction control unit (ICU). In some embodiments, each of the slices operates completely independently and can only be coordinated using barrier-like synchronization primitives or through the compiler by exploiting "tractable determinism."

In some embodiments, each tile of the processor corresponds to an execution unit organized as an ×M SIMD tile. For example, each tile of the on-chip memory of the processor may be organized to store an L-element vector atomically. As such, a MEM slice having N tiles may work together to store or process a large vector (e.g., having a total of N×M elements).

In some embodiments, the tiles in the same slice execute instructions in a "staggered" fashion where instructions are issued tile-by-tile within the slice over a period of N cycles. For example, the ICU for a given slice may, during a first clock cycle, issue an instruction to a first tile of the slice (e.g., the bottom tile of the slice as illustrated in FIG. 1B, closest to the ICU of the slice), which is passed to subsequent tiles of the slice (e.g., upwards) over subsequent cycles.

Figure 3:
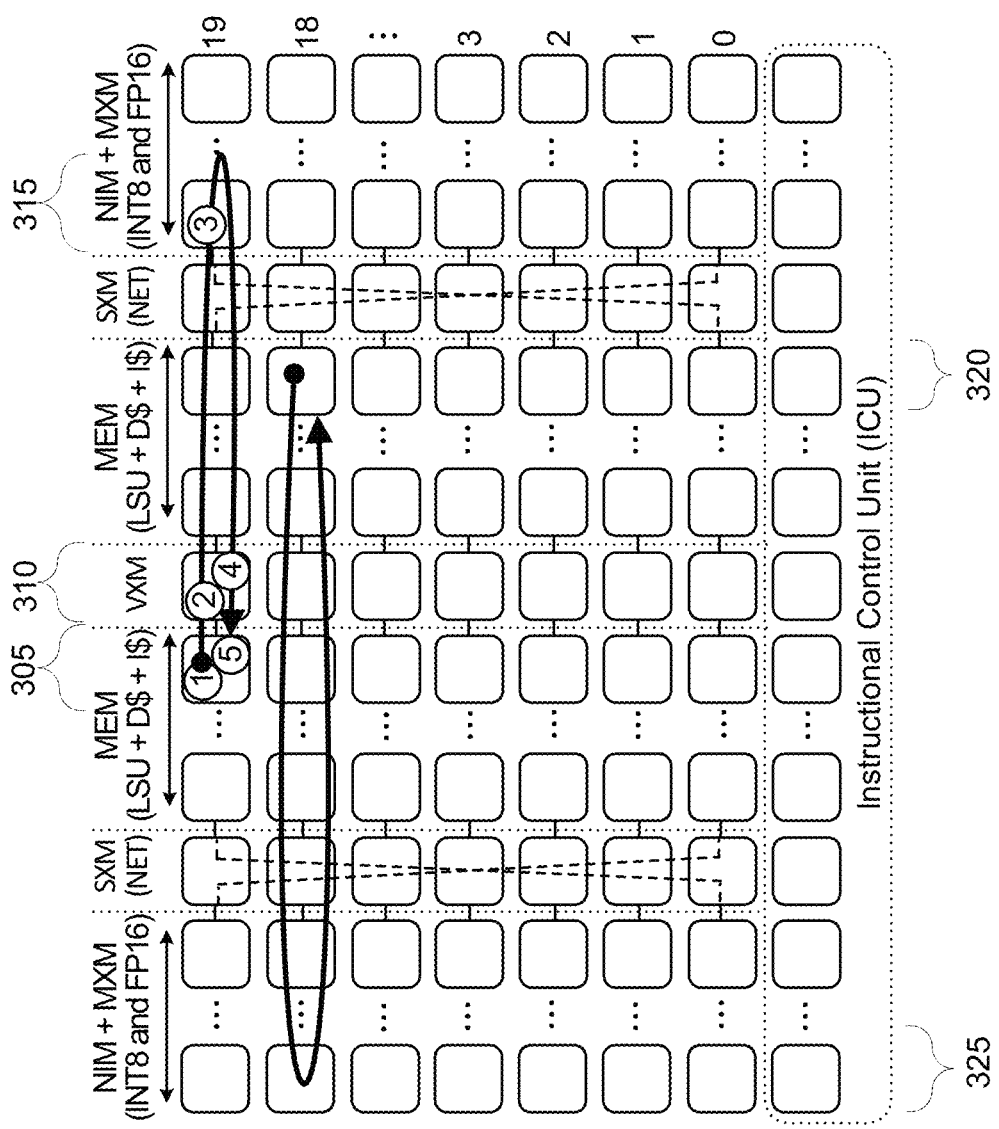
FIG. 3 illustrates an example of data flowing across the slices of a processor, in accordance with some embodiments.

In some embodiments, functional slices are arranged physically on-chip to allow efficient data-flow for pipelined execution across hundreds of cycles for common patterns. For example, FIG. 3 illustrates an example of data flowing across the slices of a processor, in accordance with some embodiments. As illustrated in FIG. 3, the functional slices of the processor are arranged such that operand data read from a memory slice can be intercepted by different functional slices as it moves across the chip, and results flow in the opposite direction where they are ultimately written back to memory. For example, a first data flow from a first memory slice 305 may flow in a first direction (e.g., towards the right), where it is intercepted by a VXM slice 310 that performs a vector operation on the received data. The data flow then continues to an MXM slice 315 which performs a matrix operation on the received data. The processed data may then flow in a second direction opposite from the first direction (e.g., towards the left), where it is again intercepted by the VXM slice 310 to perform an accumulate operation, and ultimately written back to the memory slice 305. While FIG. 3 illustrates that data flow performing a single "u-turn" (change in direction) corresponding to a single matrix operation before being written back to memory, in some embodiments, a particular data flow may change direction multiple times (due to multiple matrix and vector operations) before the resulting data is written back into memory.

In some embodiments, the functional slices of the processor may be arranged such that data flow between memory and functional slices may occur in both the first and second direction. For example, FIG. 3 illustrates a second data flow originating from a second memory slice 320 that travels in the second direction towards a second MXM slice 325, where the data is intercepted and processed by the VXM slice 310 en route to the second MXM slice. The results of the matrix operation performed by the second MXM slice 325 then flows in the first direction back towards the second memory slice 320.

In some embodiments, configuring each tile of the processor to be dedicated to a specific function (e.g., MEM, VXM, MXM), the amount of instructions needed to be processed by the tiles may be reduced. For example, while MEM tiles will receive instructions to read out or store operand data, in some embodiments, certain functional tiles (e.g., MXM) may be configured to perform the same operations on all received data (e.g., receive data travelling in a first direction, and output processed data in a second direction). As such, these functional tiles may be able to operate without having to receive explicit instructions or only receiving intermittent or limited instructions, potentially simplifying operation of the processor.

To get good single-thread performance, a conventional multi-core processor design (e.g., as illustrated in FIG. 1A) typically needs to dedicate a significant portion of silicon area for exposing and exploiting instruction-level parallelism (ILP). This usually involves register renaming schemes and large instruction windows over which the instructions have no explicit understanding of the hardware on which it will execute, all the while maintaining the illusion of in-order program execution. In contrast, when using a processor (e.g., TSP) having a functional slice architecture (e.g., such as the processor 100 illustrated in FIG. 1), the TSP compiler generates an explicit plan for how the processor will execute the microprogram. The compiler specifies when each operation will be executed, which functional slices will perform the work, and which STREAM registers (described in greater detail below) hold the operands. The compiler maintains a high-fidelity (cycle accurate) model of the TSP's hardware state so the microprogram can orchestrate the data flow.

In some embodiments, the processor (e.g., TSP) uses a Web-hosted compiler that takes as its input a model (e.g., a ML model such as a TensorFlow model) and emits a proprietary instruction stream targeting the processor TSP hardware. The compiler is responsible for coordinating the control and data flow of the program, and specifies any instruction-level parallelism by explicitly bundling instructions that can and should execute concurrently so that they are dispatched together. The primary hardware structure is the architecturally-visible streaming register file (STREAMs), described in greater detail below, which serves as the conduit through which operands flow from MEM slices (e.g., SRAM) to functional slices (e.g., VXM, MXM, etc.) and vice versa.

Processor Memory

The MEM unit of the processor serves as: (1) storage for model parameters, microprograms and the data on which they operate, and (2) network-on-chip (NoC) for communicating data operands from MEM to the functional slices and computed results back to MEM. In some embodiments, the on-chip memory consumes ≈75% of the chip area of the processor. In some embodiments, due to the bandwidth requirements of the processor, the on-chip memory of the MEM tiles may comprise SRAM, and not DRAM.

The on-chip memory capacity of the processor determines (i) the number of ML models that can simultaneously reside on-chip, (ii) size of any given model, and (iii) partitioning of large models to fit into multi-chip systems.

Figure 4A:
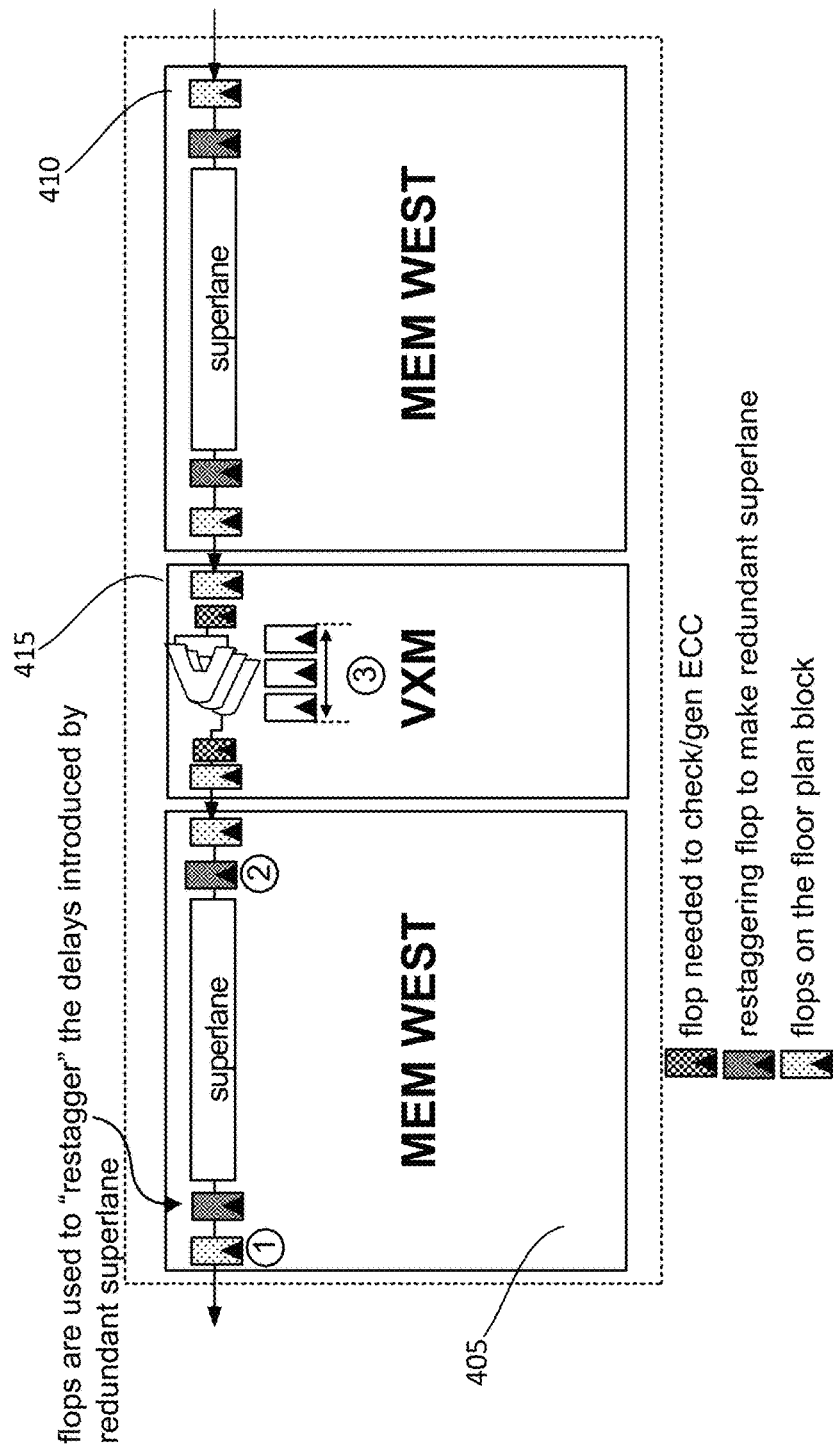
FIG. 4A illustrates a diagram of a processor having the MEM system divided into two hemispheres, in accordance with some embodiments.

In some embodiments, the MEM system of the processor provides a plurality of memory slices organized into two different hemispheres. FIG. 4A illustrates a diagram of a processor having the MEM system divided into two hemispheres, in accordance with some embodiments. As illustrated in FIG. 4A, the first hemisphere 405 and the second hemisphere 410 of memory (referred to as "MEM WEST"

and "MEM EAST", respectively) may be arranged on opposite sides of one or more functional slices (e.g., VXM slices) 415.

The memory slices of each hemisphere may mirrored, such that the slices may be physically numbered {0, . . . L} in the East hemisphere 410, and {L, . . . 0} in the West hemisphere 405, such that the memory slice 0 for each hemisphere corresponds to the slice closest to the VXM slices 415 between the hemispheres, where each hemisphere comprises L slices. The direction of data transfer towards the center of the chip may be referred to as inwards, while data transfer toward the outer (Eastern or Western most) edge of the chip may be referred to as outwards. Although the hemispheres of memory of the processor are illustrated as east and west in FIG. 4A, it is understood that in other embodiments, other names may be used to refer to the different hemispheres of memory.

In some embodiments, the two hemispheres 405 and 410 are equal in size, comprising L adjacent slices. The L slices are connected via a plurality of "superlanes." In some embodiments, each superlane connects to a row of tiles across the slices of the hemisphere. As such, the hemispheres are each organized as a two-dimensional structure with N "superlanes"×L "slices." Each memory tile of the hemisphere is located at the intersection of a slice-superlane pair, and includes an SRAM for on-chip storage. In some embodiments, the SRAM of each memory tile is addressed, and is organized internally using two banks indicated by a particular bank bit (e.g., the upper-most address bit).

In some embodiments, the SRAM of each memory tile is considered a pseudo-dual-ported SRAM since simultaneous reads and writes can be performed to the SRAM as long as those references are to different banks within the SRAM. On the other hand, two R-type (read) or W-type (write) instructions to the same internal bank cannot be performed simultaneously. In other words, the memory tile can handle at most 1 R-type and 1 W-type instruction concurrently if they are accessing different internal SRAM banks of the memory tile.

In some embodiments, each superlane may be connected to one or more boundary flops at each boundary of the hemisphere. In addition, each superlane may further be connected to one or more additional flops used to add a delay to data transmitted over the superlane, in order to restagger delays that may be caused by a "dead" or defective MEM tile in a superlane. For example, in some embodiments, if a particular MEM tile is determined to be defective, the superlane containing the defective MEM may be marked as defective, and an additional redundant superlane substituted in. The restagger flop may be used to hide an additional delay associated with the redundant superlane and preserve timing. In some embodiments, a superlane may contain a pair of restagger flops, corresponding to different directions of data flow (e.g., ingress and egress), which may be enabled to add an extra delay or bypassed (e.g., via a MUX). For example, when a redundant superlane is used, superlanes south of the redundancy may be configured to implement their respective egress restagger flops, while superlanes north of the redundancy may implement their respective ingress restagger flops.

In some embodiments, the VXM slices 415 located between the hemispheres 405 and 410 may have a fall-through latency, indicating a number of cycles needed for data travelling across the one or more functional slices that is not intercepted for additional processing. On the other hand, if the data is intercepted by the VXM slices for performing additional operations, a number of additional predetermined number of cycles may be needed.

Stream Register File (Streams)

FIG. 4B is a diagram illustrating slice organization within a hemisphere, in accordance with some embodiments. A streaming register file, referred to as STREAMS, transfers operands and results between SRAM of the MEM slices and the functional slices (e.g., VXM, MXM, etc.) of the processor. In some embodiments, a plurality of MEM slices (e.g., between 2 and 10 adjacent MEM slices) are physically organized as a set. Each set of slices may be located between a pair of STREAM register files 460, such that each slice is able to read or write to the STREAM registers in either direction. By placing STREAM register files 460 between sets of MEM slices, a number of cycles needed for data operands to be transmitted across a hemisphere is decreased (e.g., by a factor corresponding to the number of slices per set). The number of slices per set may be configured based upon a distance over which data may be transmitted over a single clock cycle.

As illustrated in FIG. 4B, the tiles of each slice each comprise a memory 450 (e.g., SRAM) and superlane circuitry 455 for routing data to and from the memory tile. The superlane circuitry 455 allows for each tile to read data from the superlane (e.g., from a STREAM register or an adjacent tile), write data onto the superlane, and/or pass through data to a subsequent tile along the superlane. In some embodiments, any slice can use any STREAM register of the STREAM register file 460, however, care must be taken so that two slices within the same set (e.g., quad-slice) are not simultaneously trying to update the same STREAM register. The software compiler may configures the program during compile time to ensure that no conflicts when accessing the STREAM registers occurs.

The STREAM register files 460 are architecturally visible to the compiler, and server as the primary hardware structure through which the compiler has visibility into the program's execution. The registers may comprise scalar registers (R0, R1, . . . Rn) and vector registers (V0, V1, . . . Vn). In some embodiments, one or more registers may correspond to ZMM registers in the x86 AVX-512 ISA extensions.

Figure 5A:
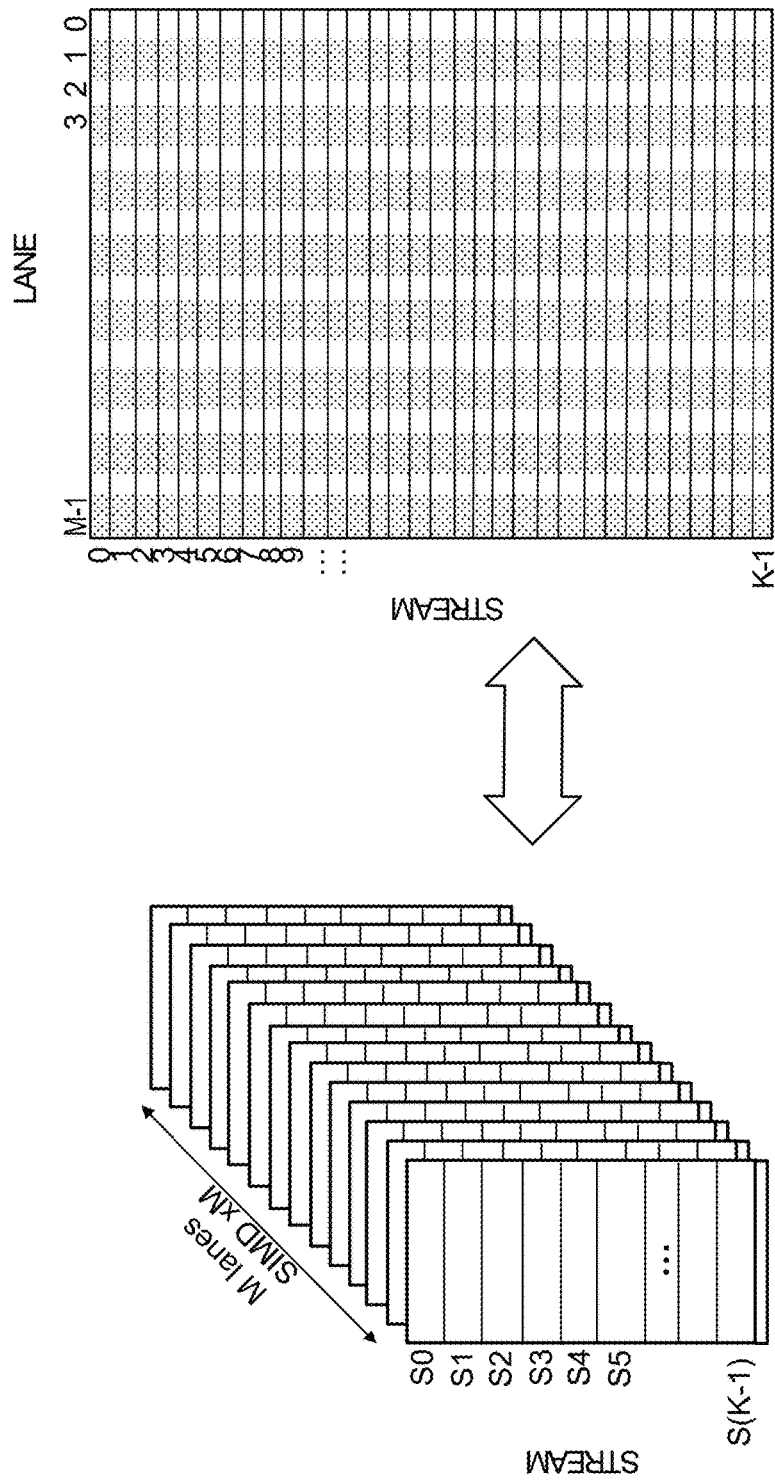
FIG. 5A illustrates a stream register file, in accordance with some embodiments.

In some embodiments, each STREAM register file 460 comprises plurality of streams S0, S1, . . . S(K−1), each stream corresponding to a basic data type (e.g., INT8). In some embodiments, each stream may be implemented as a register, collectively forming the STREAM register file 460. In some embodiments, the processor uses a set of exception flags and the architecturally visible STREAM register file S0, S1, . . . S(K−1) to communicate operands from MEM to the functional slices, and computed results from the functional slices back to MEM. In some embodiments, the STREAM register file (e.g., STREAM register file 460) is a two-dimensional register file (e.g., as illustrated in FIG. 5A), with a first dimension corresponding to a stream identifier (S0, S1, etc.), and a second dimension corresponding to the lane.

In some embodiments, each superlane connecting the tiles of different slices corresponds to a plurality of lanes bundled together. A "lane" may correspond to the basic construct for delivering data between the MEM and the functional slices. A plurality of lanes (e.g., M lanes) are bundled together into a MEM word (e.g., a superlane), which allows for SIMID computation for the functional slices of the processor. Similarly, a plurality of corresponding STREAM data may be aggregated to form a superstream corresponding to a ×M vector, where M corresponds to the number of aggregated STREAM data in the superstream. Taken together, the processor may have a plurality of superlanes, yielding a vector length corresponding to a product of the number of superlanes N and the number of lanes per superlane M.

In some embodiments, the streams of the STREAM registers are sized based upon the basic data type used by the processor (e.g., if the processor's basic data type is an INT8, each stream of the STREAM register file may be 8-bits wide). In some embodiments, in order to support larger operands (e.g., FP16 or INT32), multiple streams of a STREAM register file may be collectively treated as one operand. In such cases, the operand data types are aligned on proper STREAM boundaries. For example, FP16 treats a pair of stream registers as a 16-bit operand, and INT32 groups a bundle of four STREAMs to form a larger 32-bit data.

In some embodiments, a number of streams K implemented per STREAM register file is based upon an "arithmetic intensity" of one or more functional slices of the processor. For example, in some embodiments, the MXM slices of the processor are configured to take up to K streams of input. As such, each STREAM register file may comprise K streams configured to transmit operand data in each direction (e.g., inwards and outwards), allowing for K streams of inputs to be provided to the MXM slices of the processor. For example, in some embodiments, the processor may comprise VXM slices having VXM tiles configured to consume one stream per operand (total of 2 streams) to produce one stream of results, and MXM slices having MXM tiles configured to take up to K streams of input and produce up to multiple streams of output (e.g., <K) per cycle. As such, the process may comprise K streams per STREAM register file configured to transmit operand data inwards towards the MXM, and K streams per STREAM register file configured to transmit operand data outwards from the MXM.

FIG. 5A illustrates a streaming register file, in accordance with some embodiments. The streaming register file 500 may correspond to a STREAM register file 460 as illustrated in FIG. 4B. The streaming register file 500 may be configured be able to store data corresponding to a number of streams K, each stream having a plurality of elements (e.g., INT8 elements) corresponding to a superlane (e.g., M lanes), allowing for multiple superlanes of data to be provided to or received from a functional tile of the processor.

Figure 5B:
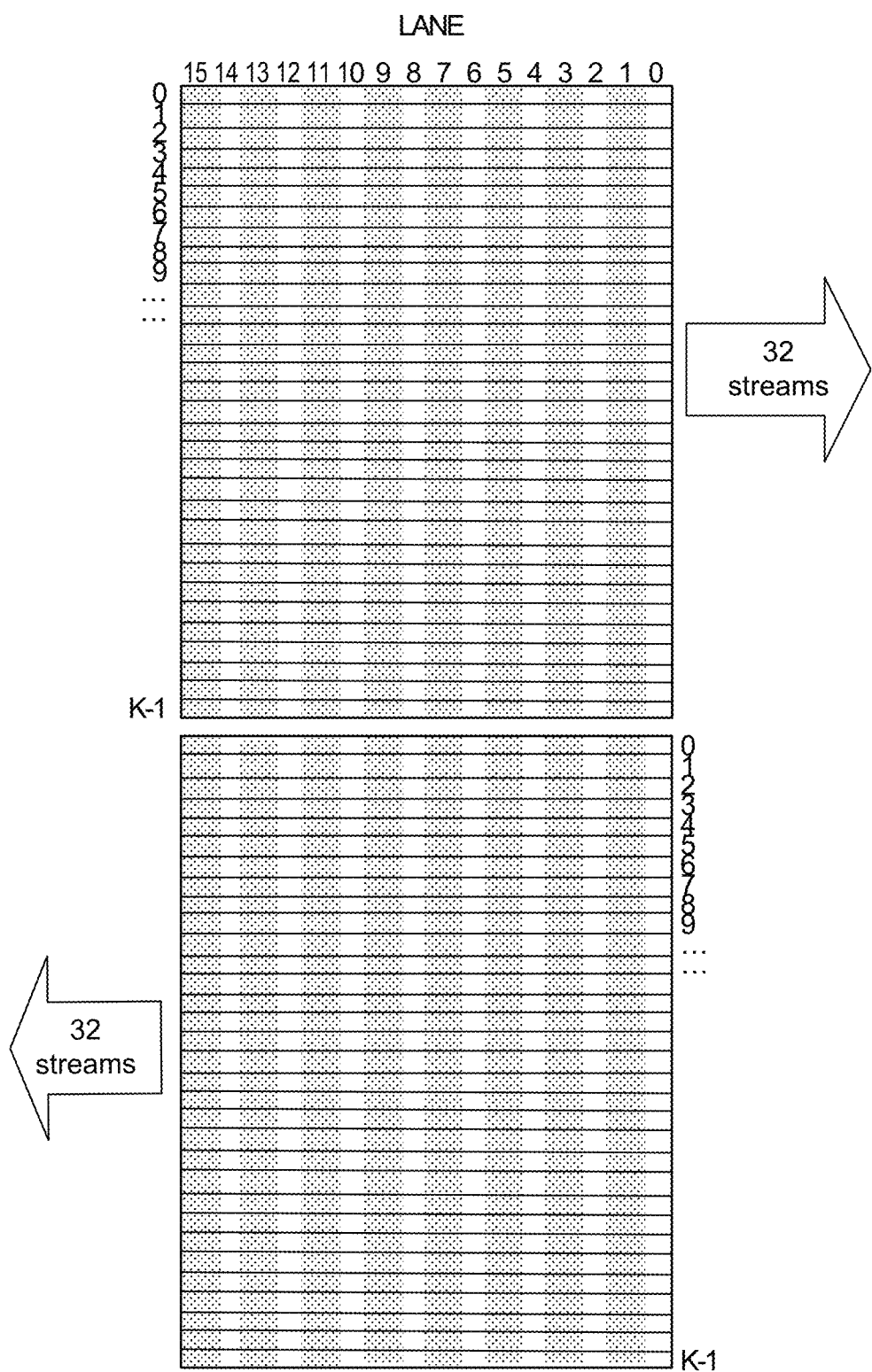
FIG. 5B illustrates stream register flow in a stream register file, in accordance with some embodiments.

FIG. 5B illustrates stream register flow in a stream register file of a functional slice processor, in accordance with some embodiments. As illustrated in FIG. 5B, the stream register file contains stream registers allowing for data to flow in two directions (e.g., inwards and outwards).

Memory Words

A streaming processor requires abundant throughput in both the memory and on-chip network to keep the arithmetic functional units busy. The most common data type on which the functional slices operate is INT8 and FP16. In some embodiments, the data flow on the chip is organized as a number of parallel lanes that can be aggregated and grouped efficiently on an SRAM chip (e.g., corresponding to a MEM tile of the processor). The SRAM chip on each MEM tile may be organized into a plurality of SRAM words, which may function the atomic unit of transfer in the memory system.

Figure 6:
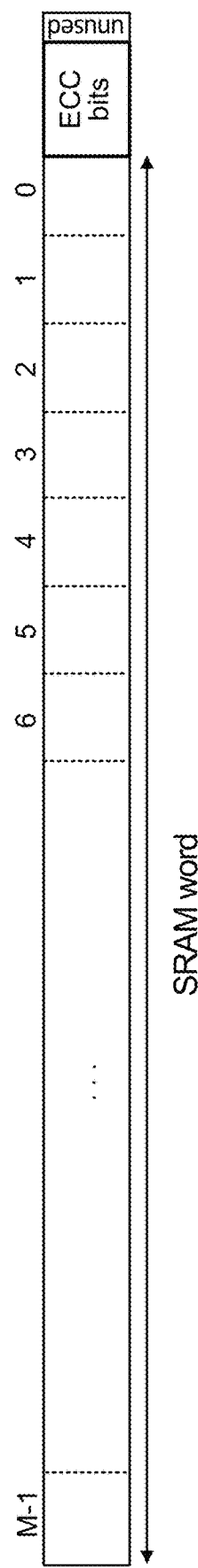
FIG. 6 illustrates an SRAM word of a MEM tile of the processor, in accordance with some embodiments.

FIG. 6 illustrates an SRAM word of a MEM tile of the processor, in accordance with some embodiments. The SRAM word 600 is able to store values corresponding to a plurality of lanes (e.g., M lanes) of INT8 data, allowing for data-parallelism (SIMD) to be provided to each tile. In addition, each SRAM word may contain a number of ECC bits and one or more "spare" (e.g., unused) bits used for error reporting. In some embodiments, each word is stored using little endian ordering, where the least-significant byte is stored at the lowest address (0, . . . M) in the word. The error correcting code (ECC) bits are not software-visible, and therefore their position within the memory word may be less important.

Memory Reference Types

In some embodiments, Memory (MEM) instructions are divided into three categories: (1) instructions for configuring an address generation table (AGT), (2) direct references like Read and Write and indirect references like Gather, and Scatter, and (3) power management instructions like PowerConfig and DeepSleep. AGT-type instructions (such as iterative operations) are used to manipulate registers in the AGT, which decouples address generation from the memory operation itself, allowing address calculation in a formulaic fashion, to calculate the next address in a sequence of references emitted by an iterated MEM instruction.

In some embodiments, the MEM Scatter and Gather instructions assume little-endian byte ordering when using the bottom bytes of a stored word (e.g., a bottom number bytes of a M-byte memory word) corresponding to an address stream operand for an address. For example, for a Scatter or Gather instruction, each tile produces 1 element of the vector (in effect, the Gather and Scatter produce a shorter N-element vector). A series of M Scatter/Gather instructions is used to build up a larger N×M-element vector.

Addressing

Each MEM tile may correspond to the intersection of a superlane-slice pair, and contains an addressable SRAM, allowing for each slice to have an addressable capacity corresponding to the total size of the SRAMs of the N tiles that make up the slice. Because each slice of the processor is functions independently, each slice can be treated as a parallel bank of memory.

Addresses specified in MEM instruction are physical addresses. In some embodiments, the processor does not support any address translation on the chip, but does support bounds checking through use of a segment register in the MEM, which may be set using a SetSegment instruction. MEM instructions like Read and Write are considered direct references since they specify the address directly in the instruction. In some embodiments, all direct MEM instructions undergo a bounds check to make sure the address falls within some valid target range.

Figure 8:
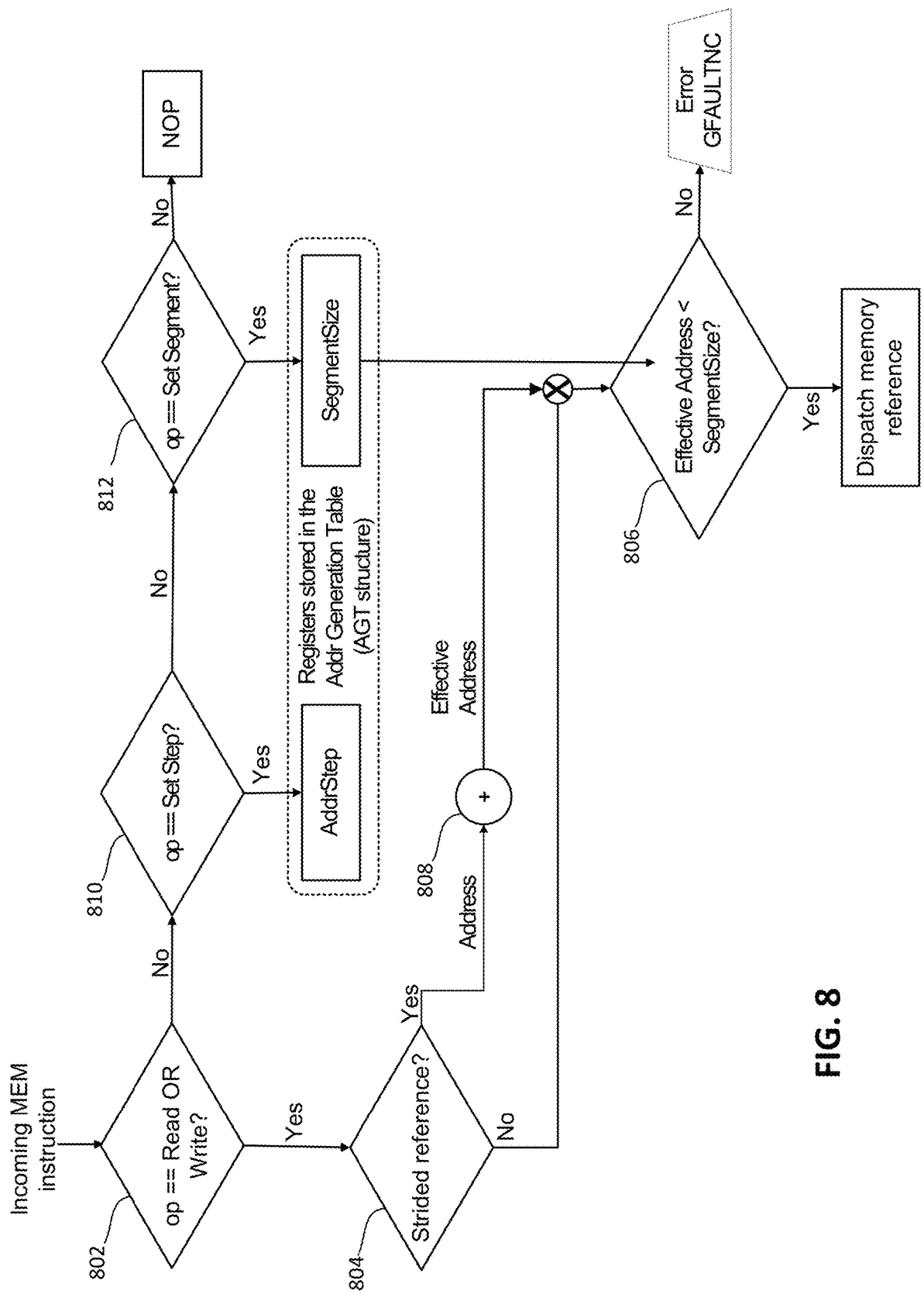
FIG. 8 illustrates a flowchart showing how memory instructions may undergo bounds checks against a predetermined segment size, in accordance with some embodiments.

FIG. 8 illustrates a flowchart showing how memory instructions may undergo bounds checks against a predetermined segment size, in accordance with some embodiments. At 802, an incoming MEM instruction is checked to determine if it is a read or write instruction. If so, at 804 a determination is made as to whether an address associated with the instruction is a strided reference or not. If not, the address may be directly compared to the segment size at 806 to perform the bounds check. On the other hand, if the address is a strided reference, the address made be added to an address step value at 808 to produce an effective address that can be compared with the segment size.

On the other hand, if the incoming instruction is not a read or write instruction, determinations are made as to whether the instruction is a SetStep instruction (at 810) for updated the address step value, or a SetSegment instruction (at 812) for updating the segment size value.

Strided References

In some embodiments, the processor may operate on vectors using special addressing modes for strided references. A common access pattern for vectors is to access each element sequentially, $a_i, a_{i+1}, \ldots$.

Each slice may comprise a hardware structure implementing an address generation table (AGT) configured to control strided references using several parameters. Table 1 below illustrates example parameters that may be maintained by the AGT, in accordance with some embodiments.

TABLE 1

| AGT Parameter | Parameter Descriptions |
|---|---|
| AddrStep | Stride (address offset) of each subsequent reference |
| Stream Step | STREAM register to be used for the reference (Optional) |
| NumIters | Loop bounds specify the number of iterations to perform |
| Countdown | Delay between references |
| SegmentSize | Maxim segment size |

In some embodiments, since the processor may be configured to operate on multidimensional data structures, the AGT can specify different stride values for different dimensions. The AGT as such acts as a configurable state machine that implements a set of nested loops (e.g., up to four nested loops) to naturally support walking over a three-dimensional data structure as shown below.

```
Instruction instr = get_instruction_to_loop( )
For (d=0; d<iters_d; d++)
    For (c=0; c<iters_c; c++)
        For (b=0; b<iters_b; b++)
            For (a=0; biters_a; a++)
                Issue(instr);
                If (a<(iters_a-1))
                    Instr.addr += step_a;
                    Wait(countdown_a);
                If (b<(iters_b-1))
                    Instr.addr += step_b;
                    Wait(countdown_b);
                If (c<(iters_c-1))
                    Instr.addr += step_c;
                    Wait(countdown_c);
                If (d<(iters_d-1))
                    Instr.addr += step_d;
                    Wait(countdown_d);
```

In some embodiments, a conventional microprocessor can at most bring in 64 bytes (with AVX2) as the largest data size operated on by instructions, however the TSP can generate 1000s of bytes from a single iterated Read instruction. The AGT allows a convenient and compact encoding for multi-dimensional data by allowing any Read, Write, Gather or Scatter to be iterated. An iterated MEM instruction may execute for 100s of cycles.

In some embodiments, the AGT fields are set using a plurality of Set* instructions (e.g., SetCountdown, SetStep, and SetNumIterations), which set their respective registers in the AGT. The AGT may support up to four loop indices, allowing for emulation of the reference stream that would be emitted by four nested loops. In some embodiments, The loop index is implied by the order and number of Set* instructions, for example:

Read [a], S1/Read contents of MEM[a] and assign to stream S1
SetCountdown 1/loop index 0
SetStep 4/loop index 0 (inner-most loop) stride=4
SetNumIterations 10/loop 0 bounds In some embodiments, the slice may be issued a long running instruction, corresponding to an instruction that is issued repeatedly in time (i.e., a sequence of instructions) generating a new address on each reference. In the case of the AGT, a nested looping structure is supported that can be programmed to support anywhere from one to four dimensions. Each loop is able to vary both an inter-issuance delay (i.e., countdown) and also a step (i.e., stride) that is applied to the instructions address.

In some embodiments, configuring the AGT adheres to the following rules: (1) the order of operations for configuration instructions will be in the order of SetCountdown→SetStep→SetNumIterations, (2) loops are configured in order from the inner-most loop to the outer-most loop, (3) a SetCountdown instruction will have a valid range of $\{1, \ldots 2^N-1\}$, where any values less than 1 will be defaulted to a value of 1, (4) SetNumIterations will have a predetermined minimum value (e.g., 3), and (5) any loop configuration write which does not advance in the progression from countdown to step to iterations implicitly advances the loop configuration pointer (i.e., enables the next loop out and applies a value to its descriptor). For example, in order to simply advance the loop configuration pointer without altering any of the default values of the loop being committed, one must issue a SetStep of zero followed by either a SetCountdown or SetStep.

Figure 9:
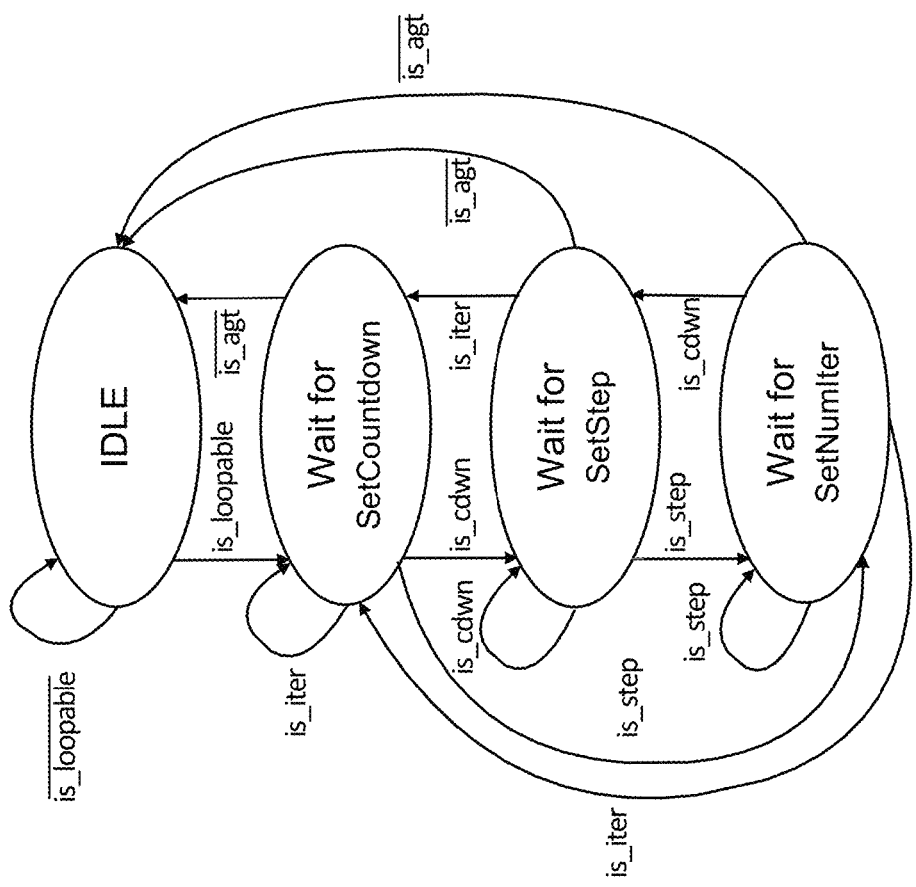
FIG. 9 illustrates a state transition diagram showing configuration of the AGT, in accordance with some embodiments.

FIG. 9 illustrates a state transition diagram showing configuration of the AGT, in accordance with some embodiments. In order to enable any loop, at least one AGT descriptor write must be issued to it. As illustrated in FIG. 9, in order to configure the AGT, the instructions received by the AGT should be in a specific order. During the configuration process, any received non-AGT instructions may cause the AGT to return to an IDLE state. In some embodiments, one or more of the "set" instructions may be skipped when configuring the AGT (e.g., as illustrated in FIG. 9, the configuration state of the AGT may advance from "wait for setCountdown" to "wait for setNumIter" if a setStep command is received instead of a setCountdown command), whereupon a default value may be used (e.g., a default setCountdown value).

In some embodiments, the AGT is able to receive any loop configuration information once a loopable instruction (e.g., is_loopable, which may correspond to a read, write, gather, or scatter). The loop configuration information is streamed to the AGT at a rate of 1 instruction/cycle. The loop structure of the AGT may implement a set of nested loops (e.g., a 4-D set as shown above), each of which may be configured using three instructions (e.g., setCountdown, setStep, and setNumberIter). As illustrated in FIG. 9, these instructions may be received explicitly. However, if any of the set* instructions are skipped (e.g., a setCountdown is received following a setStep instead of a setNumberIter), then the current loop being configured is closed (and configured using default values), and the next set instruction (e.g., setCountdown) is applied to next loop.

In some embodiments, the default values for configuration values for a loop may correspond to values that may not be able to be explicitly expressed without presenting timing issues. For example, if a particular loop is to have the {countdown, step, numIter} configuration of {0, 0, 2}, when the first inner loop iteration is complete, the AGT will not yet have received a numIter configuration setting. By implicitly advancing configuration settings to the next loop by presenting instructions for setting the AGT configuration out of order, these configuration values can be implicitly signaled to the AGT. As such, in some embodiments, when a setCountdown, setStep, or setNumberIter instruction is not received, countdown, step, and numIter for a loop may be set as the default values 0, 0, or 2, respectively.

The following demonstrates an example of how configuring the step, countdown, and iterations using the AGT may be used to generate a sequence of instructions based upon a single operation Op(A) (e.g., a read or write operation directed to address A):

Op(A),Step(2),AGT→Op(A),Op(A+2)Op(A),Cdwn(1),
AGT→Op(A),NOP,Op(A)Op(A),Step(0),
Cdwn(1)→Op(A),Op(A),NOP,Op(A),Op(A)Op
(A),Iter(3),Cdwn(2),Step(1)→Op(A),Op(A),Op
(A),NOP,NOP,Op(A+1),Op(A+1),Op(A+1)

Figure 10:
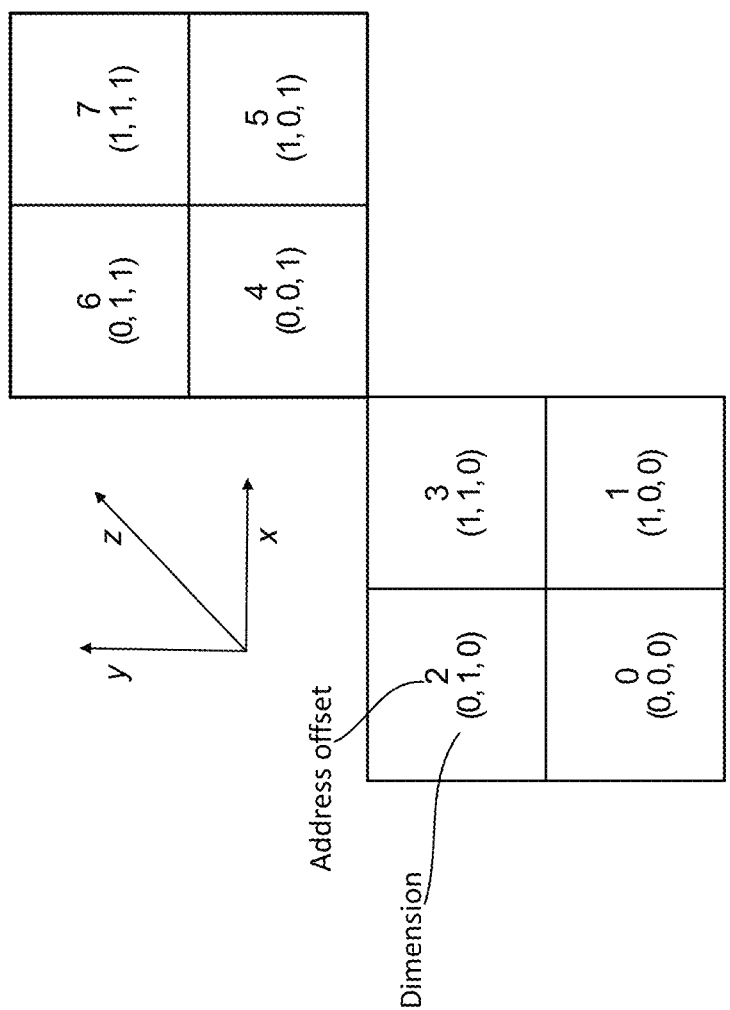
FIG. 10 illustrates an example two-cubed dataset to be traversed, in accordance with some embodiments.

FIG. 10 illustrates an example two-cubed dataset to be traversed, in accordance with some embodiments. The dataset may be stored in memory as a flattened structure, each element at an address as indicated in FIG. 10. The illustrated dataset may be traversed in various dimension major orderings. For example, the following illustrates examples of how to configure the AGT to properly traverse the structure for a permutation of the dimension orderings, each dimension of the structure corresponding to a loop of the nested loops.

X,Y,Z→Rd,SetStep(+1),SetStep(+1),SetStep(+1)

X,Z,Y→Rd,SetStep(+1),SetStep(+3),SetStep(−3)

Y,X,Z→Rd,SetStep(+2),SetStep(−1),SetStep(+1)

Z,X,Y→Rd,SetStep(+4),SetStep(−3),SetStep(−3)

Y,Z,X→Rd,SetStep(+2),SetStep(+2),SetStep(−5)

Z,Y,X→Rd,SetStep(+4),SetStep(−2),SetStep(−5)

Each step may indicate a relative offset from the dimension of the previous loop. For example, when traversing the structure in (X, Y, Z) order, the step values for the loops include a first step of +1 (corresponding to a step in X), a second step of +1 (back in X, forward in Y), and a third step of +1 (back in X and Y, forward in Z). On the other hand, if traversing in (Z, X, Y) order, the step values for the loops may include a first step of +4 (forward in Z), a second step of −3 (back in Z, forward in X), and a third step of −3 (back in Z and X, forward in Y).

Instruction Fetching

Figure 7:
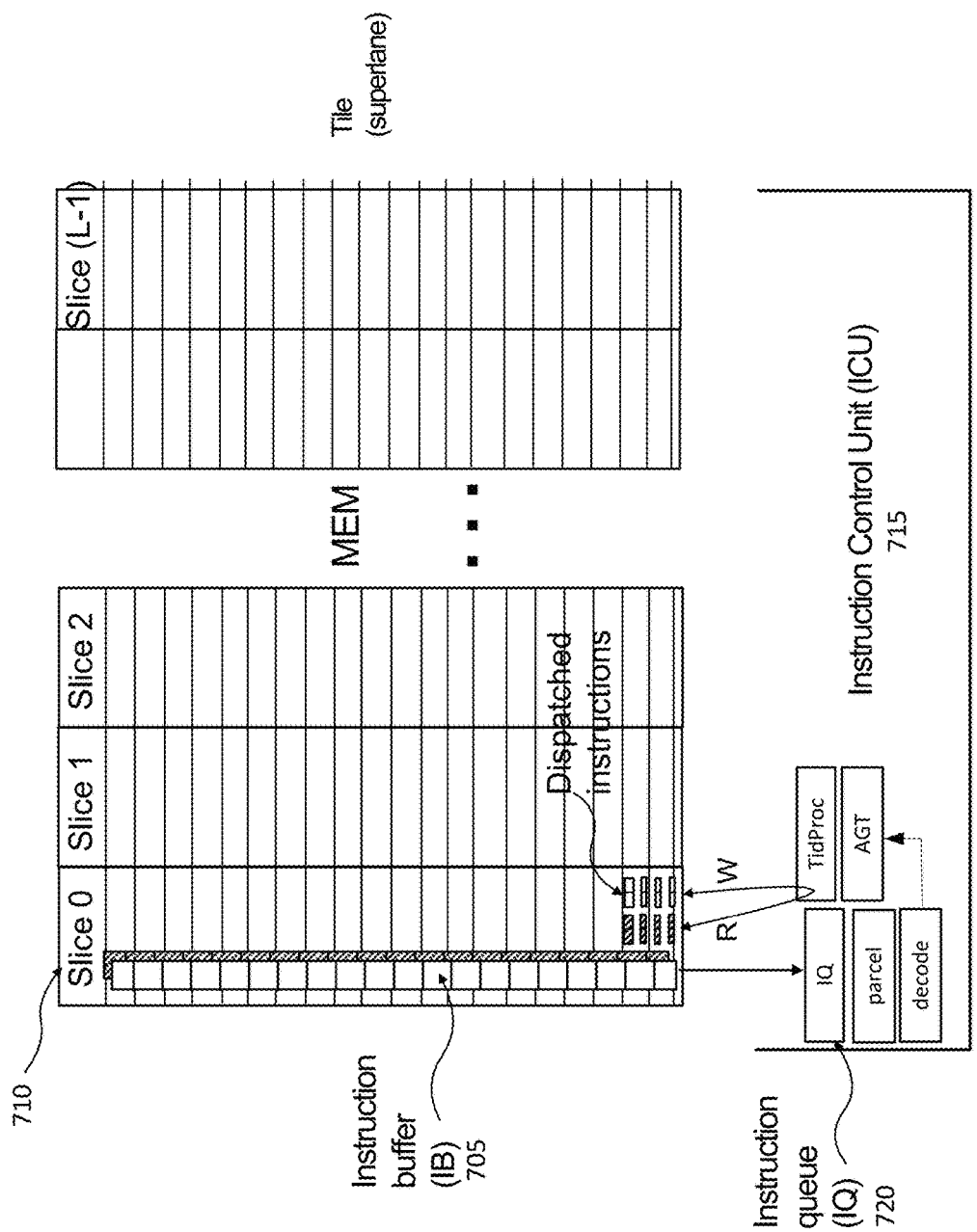
FIG. 7 illustrates instruction buffers and an instruction control circuit for a slice on a processor, in accordance with some embodiments.

In some embodiments, the compiler for the processor emits a byte-stream of individual instructions which are stored in main memory in at least one instruction buffer. FIG. 7 illustrates instruction buffers and an instruction control circuit for a slice on a processor, in accordance with some embodiments. In some embodiments, the instruction buffer comprises a pair of instruction buffers 705, each corresponding to a different thread (described in greater detail below). Each instruction buffer 705 may be oriented parallel to a slice 710 (e.g., north-south direction), and flow into an ICU 715, where the instructions will be parceled into multiple micro-instructions to be dispatched to the functional units (tiles) within the slice 710. For example, the instruction buffer 705 for the slice 710 may be implemented as part of the memory tiles of the slice 710 (e.g., corresponding to one or more predetermined addresses with the SRAM of each tile). In other embodiments, instructions corresponding to each thread may be stored in a single buffer (e.g., a thread-agnostic buffer).

The instructions received by the ICU 715 from the instruction buffers 705 may undergo the following stages: Enqueue, Parcel, Decode, Address Generation/Iteration, and Dispatch. In Enqueue, incoming instructions are pushed onto an instruction queue (IQ) within the ICU. In some embodiments, there is no flow control on the IQ for instruction fetches. As such, the IQ may be referred to as a "skid buffer," and may be sized to be able to absorb the entire instruction buffer. For example, if an Ifetch (instruction fetch) instruction is issued, the IQ 720 must have necessary space for the incoming instruction buffer words, starting a predetermined number of cycles after the Ifetch is issued and continues for the next number of cycles. These latency parameters are programmable in the ICUs CSR space (e.g., using a *fetch round trip CSR).

At the Parcel stage, the ICU 715 determines which instructions can be dispatched together. For example, the parcel stage may present a next set of n or fewer (should there be insufficient data available) instructions to be decoded, where n corresponds to a maximum number of instructions that can be consumed in a single cycle. At the Decode stage, the ICU 715 examines the instructions in the instruction window to determine if they can simultaneously issue. For example, in some embodiments, one instruction fetch (from streams), and one read and write operation per thread, can be issued simultaneously, and thus can be parceled together.

At the Address Generation/Iteration stage, the ICU 715 may calculate the effective address if the instruction is being iterated, by adding the address step (stride) to the base address to form the effective address for the reference. The address may also be bounds checked against the ADDR SEGMENT SIZE which is set with the SetAddrSegment instruction (e.g., as illustrated in FIG. 8).

Figure 11:
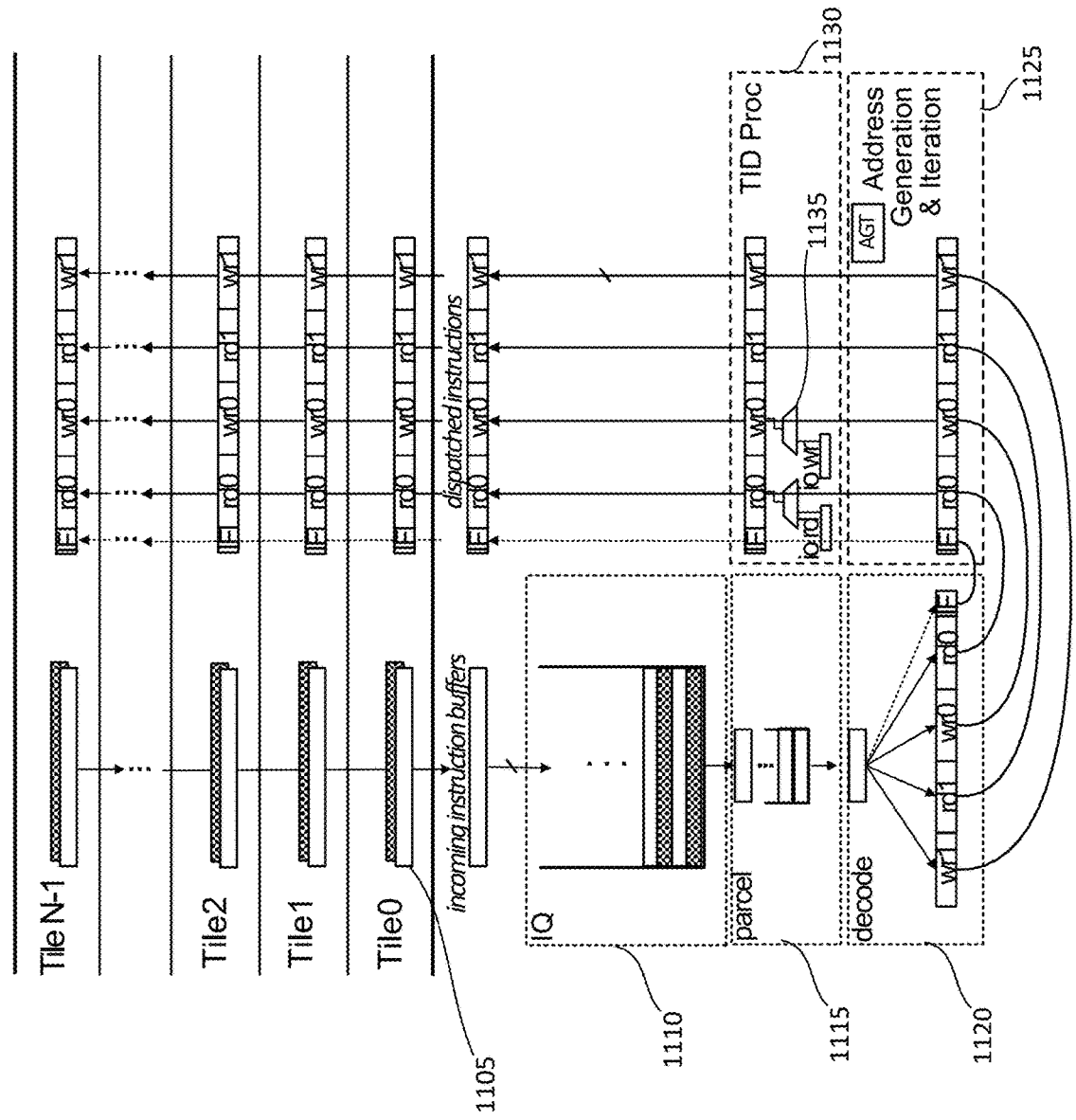
FIG. 11 illustrates a diagram of the flow of instructions within an ICU, in accordance with some embodiments.

At the Dispatch stage, the ICU 715 dispatches the instructions to the tiles of the slice, which may be issued northward on their respective dispatch path across the slice 710. In some embodiments, the ICU may merge the instructions with one or more incoming I/O read/write instructions received via an I/O mechanism. For example, the ICU 715 may select between an instruction received from MEM (e.g., from the IB) or an instruction received via the I/O mechanism, and dispatch the selected instruction to the slice 710. For example, as illustrated in FIG. 11, a TidProc module is used to merge the instruction stream with an I/O stream, the resulting instructions being dispatched to the memory slice.

Instruction Dispatch and Instruction-Level Parallelism

Once the instruction is decoded by the ICU and ready for issuance, the instructions may flow from the ICU to all the tiles that make up its corresponding functional slice (e.g., in a South-to-North direction). In order to convey instructions to the slice, the processor utilizes (i) an instruction buffer (IB) that holds the byte stream of compiler-emitted instructions, and (ii) an instruction queue (IQ) which holds the instructions in preparation for decode and dispatch.

In some embodiments, the processor operates in a globally synchronous manner, and ensures that all IQs across all slices never run empty. Because all instruction dispatch times are relative to the instructions ahead of it, allowing the IQ to run empty may cause loss of temporal information.

In addition, because the incoming instructions to the IQ may not be flow controlled, the compiler must ensure that there is adequate room in the IQ to store the entire size of incoming instructions from the IB. In some embodiments, the IQ may have a capacity that is larger than that of the IB (e.g., twice as large), to allow for a window of time over which the compiler can fetch a new instruction buffer and not run the IQ empty. In some embodiments, when fetching a new instruction buffer into the instruction queue, any memory contents that correspond to a predetermined code sequence (e.g., a code sequence intentionally patterned with all 1s) will not be enqueued in the IQ. This allows the compiler to generate basic blocks of code which can be smaller than the full size of the instruction buffer IB. Instead, program instructions can be padded out (using blocks of is) to be an integral number of MEM words, the padded portions not being enqueued on the IQ, resulting in smaller executable program footprint.

FIG. 11 illustrates a diagram of the flow of instructions within an ICU, in accordance with some embodiments. In some embodiments, the instruction buffer is configured to store multiple threads of instructions (e.g., 2 different threads, thread0 and thread1). For example, as illustrated in FIG. 11, each tile of the slice may contain instruction buffers 1105 storing two instructions corresponding to two different threads. Each thread may correspond to a predetermined address of the tile (e.g., thread0 may correspond to the address a1 for each tile, while thread1 corresponds to the address a2 for each tile). The stored instructions may be transferred onto the instruction queue (IQ) 1110 of the ICU in an interleaved pattern. The parceller 1115 of the ICU determines which instructions in the IQ can be parceled together. The parceled instructions may then be decoded at a decoder 1120.

The decoded instructions undergo address generation/iteration at address generation & iteration 1125. In some embodiments, where the instruction buffer comprises multiple threads, the parceled instructions may undergo thread identification (TID) processing 1130 to identify which of the instructions to be dispatched correspond to which thread. The instructions may then be dispatched to the slice (e.g., northwards). In addition, in some embodiments, the ICU may merge the instructions with one or more incoming instructions received via an I/O mechanism. For example, the ICU may uses selection circuitry 1135 (e.g., one or more MUXs) to select between an instruction received from IB 1105 and an instruction received via the I/O mechanism, and dispatch the selected instruction to the slice.

In some embodiments, the memory system can dispatch from 0-5 memory instructions in any given cycle. For example, the memory system may dispatch one read (R-type) and one write (W-type) instruction, per thread. This can issue 1R and 1 W per thread up to 4 instructions per clock cycle.

Instruction fetch (Ifetch) instructions may be used to load the instruction buffer of the slice with instructions. In some embodiments, the compiler can flexibly allocate instructions anywhere with the MEM slices of the processor. If the instructions to be fetched are within the slice, the instructions can be fetched directly from the slice's address space. If the instructions are on a different slice, the instructions can be read onto a superlane and stored at a STREAM register, allowing for the instruction to be fetched using Ifetch.

In some embodiments, Ifetch instructions must be issued on both threads. For example, a pair of Ifetch instructions may be performed back to back, each yielding an instruction vector for a respective thread. As illustrated in FIG. 11, the instruction buffers may be interleaved in time, so that the first instruction buffer is fetched in the first Ifetch a1, followed by second instruction buffer in the second Ifetch a2, such that the fetched instruction buffers may comprise $\{MEM[a1_0], MEM[a2_0], MEM[a1_1], MEM[a2_1], MEM[a1_2], \ldots\}$.

In some embodiments, while instructions for MEM slices may be fetched from the slice's own SRAM memory or received via stream, instructions for the instruction buffer of functional slices are received from the MEM slices via stream (due to having no SRAM of their own). The received instructions may then be processed by the ICU of the slice, and dispatched across the tiles of the slice (e.g., north-south direction). In some embodiments, instructions for different types of slices may have different sizes (e.g., instructions for MEM slices may have different sizes from instructions for VXM slices).

Staggered Instruction Execution

Instructions in the TSP are executed by the tiles in each functional slice. In some embodiments, instruction buffers are fetched into the ICU (instruction control unit) and multi-way instruction dispatch to the functional slice. Each tile in the slice inspects the instruction stream on the thread with which it is associated, executes the instruction, and passes it to the adjacent (Northern) tile. This tile-by-tile staggered execution transforms a 1D vector into a 2D tensor by staggering the data in time.

Figure 12:
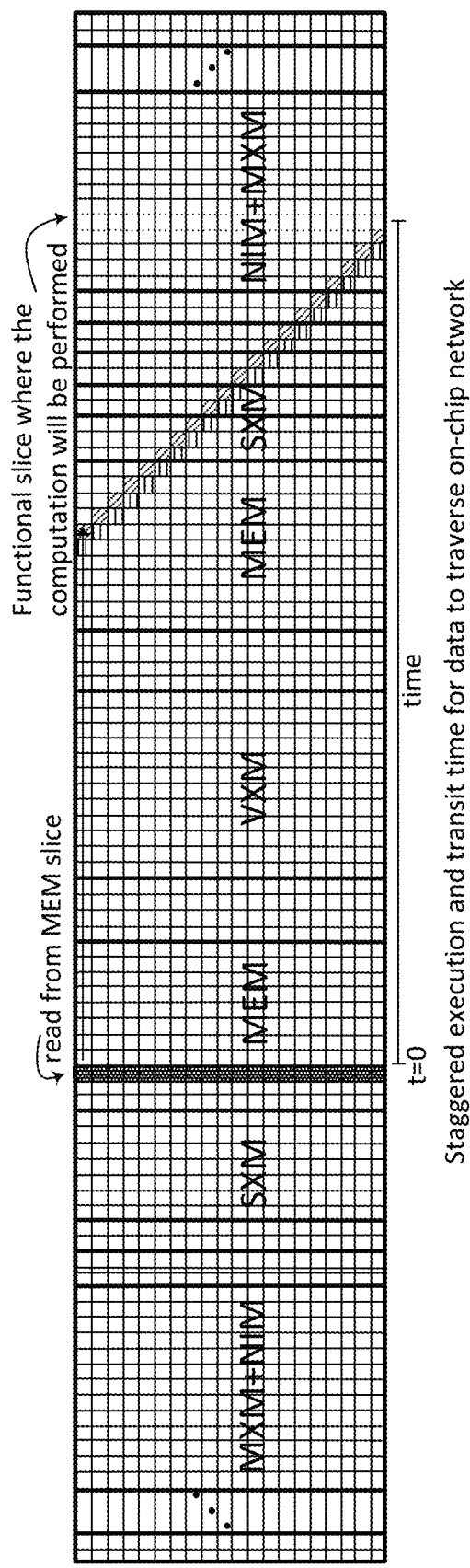
FIG. 12 illustrates an example of how execution of multiple tensors by the processor may be staggered and pipelined, in accordance with some embodiments.

FIG. 12 illustrates an example of how execution of multiple tensors by the processor may be staggered and pipelined, in accordance with some embodiments. As illustrated in FIG. 12, the instruction buffer may be read by the ICU at a time t=0. The instructions are then dispatched to the tiles of the slice over a plurality of cycles (e.g., one tile per cycle, starting from a bottom tile towards a top tile). Therefore, at a later time t=T when the data read from the bottom tile reaches the functional slice where computation is to be performed, the corresponding data from the remaining tiles of the slice may not have reached the functional slice yet. For example, the data corresponding to each subsequent tile of the slice may be one or more slices behind the data of a previous tile.

Threading in the Memory System

In some embodiments, how efficiently the process is able to process different sized tensors may be based on the vector length (VL) of the processor. For example, a processor with a vector length VL may be ideally suited for processing VL×VL tensors. This allows efficient operation on large tensors (>VL elements in a dimension), but is less efficient for smaller tensors.

In some embodiments, to improve the efficiency of processing smaller tensors, the hardware of the processor may be partitioned into two regions: one for each "liquid thread." As used herein, the term "liquid threading" refers to partitioning the on-chip resources to allow more efficient use on smaller tensors. When performing tasks on short tensors (<VL), hardware resources can be bifurcated to allocate each tile within a slice to a particular thread. For the memory system, the thread identifier is used as a write mask to avoid writing portions of the vector that do not belong to the assigned thread.

In some embodiments, the two "liquid threads" share the MEM instruction buffer (e.g., as illustrated in FIG. 11). For example, thread 0 and thread 1 instructions can be co-mingled and must be interleaved by the compiler to control the issuance of the instruction to that memory slice. In some embodiments, the two liquid threads serve as a sort of write mask for memory operations that allows vectors which are shorter than VL to be written to memory without clobbering the contents of memory associated with the other thread.

In some embodiments, each MEM tile has an associated thread identification (TID) of either 0 or 1, allowing the MEM to be bifurcated. Each tile may be configured using a tile configuration instruction (Config), which sets the thread-id for the MEM tile. The Config instruction takes a superlane as its operand which determines where the demarcation is made between threads 0 and 1. For example, performing Config (SL=6) will set tiles 0-6 to thread 0 and the remaining tiles 7-19 set to thread 1.

Figure 13:
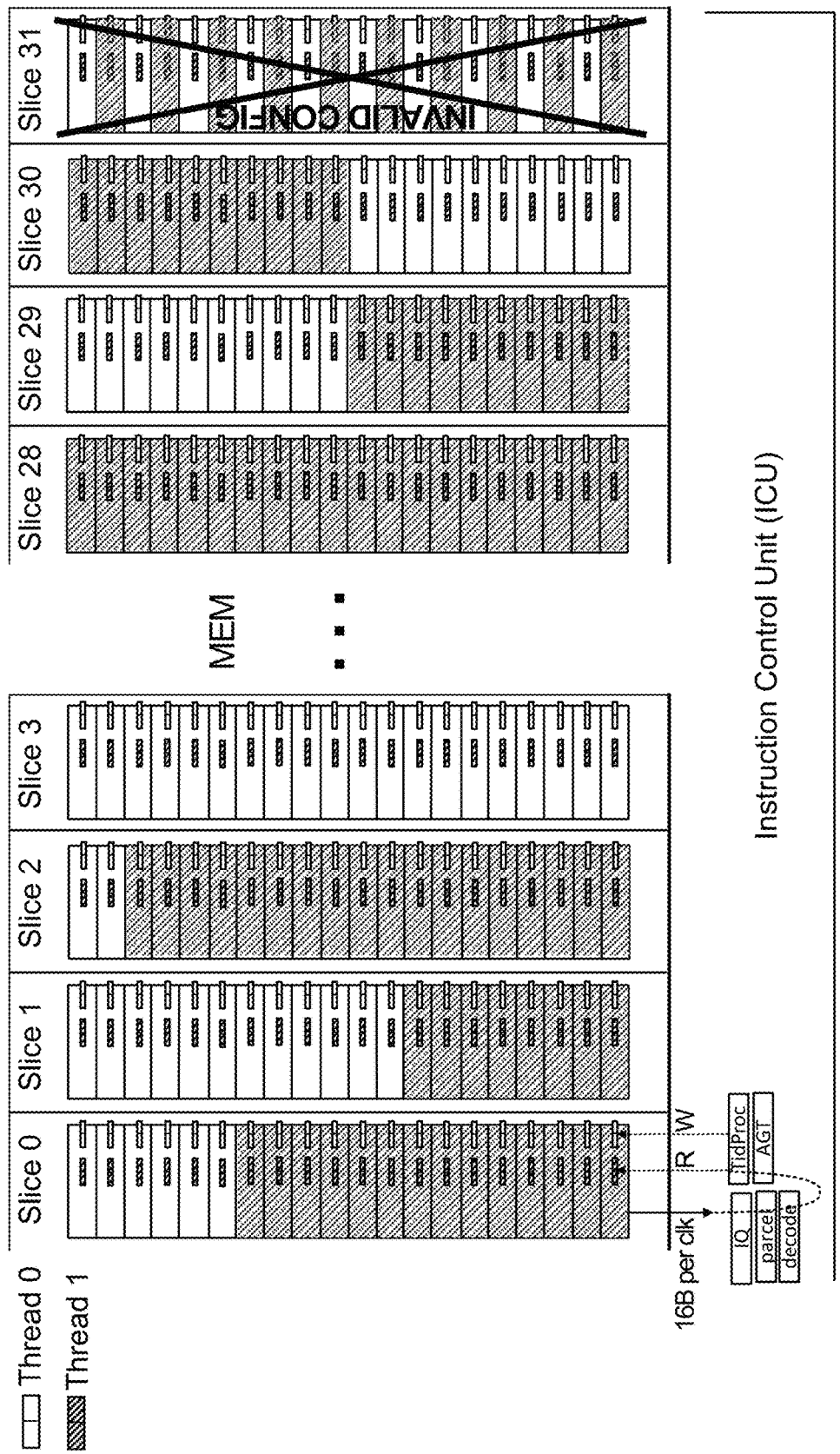
FIG. 13 illustrates examples of memory slices divided into two threads, in accordance with some embodiments.

FIG. 13 illustrates examples of memory slices divided into two threads, in accordance with some embodiments. For example, each slice in FIG. 13 is divided into two threads, with instructions processed on a per-thread basis. Each slice may be demarcated differently, such that each thread may occupy a different number of tiles on the slice.

In some embodiments, the tiles associated with each thread must be contiguous. In other words, it is not legal to have even tiles be thread0 and odd tiles be thread1, for example (as shown by the invalid configured slice 31 in FIG. 13).

The Config instruction is used to set the thread identifier for each MEM tile. A MEM tile will only react to instructions targeting its thread. FIG. 13 shows an example MEM configuration with different MEM tiles assigned to different threads.

Error Detection and Reporting

In some embodiments, the MEM block does not check the ECC on R-type instructions, nor does it generate a valid ECC on W-type instructions. For indirect accesses, the addresses are flowed through the VXM with an (ADD, 0) or some similar idempotent operation. The VXM will check the incoming stream operands ECC and generate a valid ECC on the result. This avoids silently using an indirect address vector with a soft error.

In some embodiments, the instruction buffers are large enough and replicated enough (one per functional slice) to warrant maintaining ECC through the instruction buffer path into the ICU. Because an instruction can straddle a memory word boundary (e.g., 16 bytes), the ICU keeps ECC on a pair of words and checks them prior to instruction decode (before acting on any control fields in the instruction).

In some embodiments, the system of error detection seeks to "triangulate" an error along both the slice dimension and the superlane where the error occurred. For example, the MEM block has several possible error conditions that arise during instruction execution (mostly having to do with Gather/Scatter references). In some embodiments, the "spare" bit (e.g., the last bit per superlane) on the STREAMs register file is used to indicate the error type and syndrome, which may be indicated using the notation S[0][x] as corresponding to (bit x of Stream0), bit x being the last bit. A fault-free system will always have these spare-bits cleared. On the other hand, when an error is present, the spare bits on the STREAM register file may be set as follows:

Bounds error on Gather: S[0][x]=1
Bounds error on Scatter: S[1][x]=1
Bank conflict: S[2][x]=1
parity bit: S[3][x] is the even parity of the other error bits above The spare bits of the remaining streams of STREAM register file (e.g., S[4]-S[K−1]) may be used to store auxiliary information pertaining to the error. If multiple errors occur simultaneously (e.g., Scatter and Gather error and a Bank Conflict), all the error bits may be set accordingly, but the auxiliary error data is only captured according to this priority: Gather, Scatter, then Bank conflict. In other words, if two or more errors occur, the auxiliary information for the highest priority is captured according to this priority: GATHER, SCATTER, and then Bank Conflict.

If a Gather/Scatter bounds error occurs, the auxiliary debug information may be stored into the "spare bit" in each STREAM register, and include an address, and address stream, and a data stream corresponding to the error. For example, the address value having y bits may be stored in the spare bits of a predetermined set of y adjacent streams. If a Bank conflict error occurs, the auxiliary error information is stored, comprising a write address and a read address associated with the error.

In some embodiments, if both a bank conflict and bound error on Scatter/Gather occurs—the Scatter/Gather error info is reported, but the bank conflict is still noted by setting S[2][x]=1.

Additional Considerations

The disclosed configurations may have benefits and advantages that include, for example, a more efficient data flow by separating the functions of the processor into specialized functional units, and configuring the timing of data and instructions to each functional unit, such that each unit is able operate on received data based upon a known timing between received data and instructions. Because the compiler for the processor is hardware aware, it is able to configure an explicit plan for the processor indicating how and when instructions and data operands are transmitted to different tiles of the processor. By accounting for the timing of received instructions and data, the data can be transmitted between the tiles of the processor without unnecessary metadata, increasing an efficiency of the transmission. In addition, by separating the transmission of data and instructions, instructions can be iterated and looped independent of received data operands.

In addition, because each tile of the processor to be dedicated to a specific function (e.g., MEM, VXM, MXM), the amount of instructions needed to be processed by the tiles may be reduced. For example, certain functional tiles (e.g., MXM) may be configured to perform a limited set of operations on any received data. As such, these functional tiles may be able to operate without having to receive explicit instructions or only receiving intermittent or limited instructions, potentially simplifying operation of the processor. For example, data operands read from memory can be intercepted by multiple functional slices as the data is transmitted across a data lane, allowing for multiple operations to be performed on the data in a more efficient manner.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A memory system comprising:
    a plurality of memory slices each comprising a plurality of memory tiles for storing data;
    a plurality of instruction control circuits each located at one end of a respective memory slice of the plurality of memory slices, and configured to provide instructions to memory tiles of the respective memory slice, wherein the instructions are propagated sequentially over the plurality of memory tiles of the respective memory slice; and
    a plurality of data lanes connecting corresponding memory tiles of the plurality of memory slices;
    wherein a memory tile of a memory slice of the plurality of memory slices receives at least one instruction provided by its respective instruction control circuit during a first cycle and executes an instruction of the at least one instruction on data during a second cycle, the second cycle having a predetermined temporal relationship with the first cycle based upon an instruction type of the instruction,
    wherein each of the plurality of data lanes comprises a plurality of stream register files for storing data being transported along the data lane, each stream register file adjacent to one or more respective groups of adjacent memory slices, wherein each memory slice of the group is selectively configured to read or write to its corresponding adjacent stream register files on the plurality of data lanes.

2. The memory system of claim 1, wherein each of the plurality of stream registers comprises a first set of registers storing data to be transmitted in a first direction along its respective data lane, and a second set of registers storing data to be transmitted in a second direction along its respective data lane opposite the first direction.

3. The memory system of claim 1, wherein the plurality of stream register files are architecturally visible to a compiler associated with the processor.

4. A memory system comprising:
    a plurality of memory slices each comprising a plurality of memory tiles for storing data;
    a plurality of instruction control circuits each located at one end of a respective memory slice of the plurality of memory slices, and configured to provide instructions to memory tiles of the respective memory slice, wherein the instructions are propagated sequentially over the plurality of memory tiles of the respective memory slice; and
    a plurality of data lanes connecting corresponding memory tiles of the plurality of memory slices,
    wherein a memory tile of a memory slice of the plurality of memory slices receives at least one instruction provided by its respective instruction control circuit during a first cycle and executes an instruction of the at least one instruction on data during a second cycle, the second cycle having a predetermined temporal relationship with the first cycle based upon an instruction type of the instruction,
    wherein an instruction control circuit of the plurality of instruction control circuits is configured to provide, during each of a plurality of clock cycles, a read instruction and a write instruction for each of one or more threads to memory tiles of its respective memory slice.

5. A memory system comprising:
    a plurality of memory slices each comprising a plurality of memory tiles for storing data;
    a plurality of instruction control circuits each located at one end of a respective memory slice of the plurality of memory slices, and configured to provide instructions to memory tiles of the respective memory slice, wherein the instructions are propagated sequentially over the plurality of memory tiles of the respective memory slice; and
    a plurality of data lanes connecting corresponding memory tiles of the plurality of memory slices,
    wherein a memory tile of a memory slice of the plurality of memory slices receives at least one instruction provided by its respective instruction control circuit during a first cycle and executes an instruction of the at least one instruction on data during a second cycle, the second cycle having a predetermined temporal relationship with the first cycle based upon an instruction type of the instruction,
    wherein the memory tile is associated with a thread of one or more threads, and is configured to select the instruction of the at least one instruction based on the associated thread, and to pass the instruction to a next memory tile of the memory slice.

6. The memory system of claim 5, wherein the instruction control circuit is coupled to a pair of instruction buffers, each instruction buffer of the pair of instruction buffers corresponding to a respective thread of the one or more threads.

7. The memory system of claim 5, wherein the instruction control circuit is coupled to at least one instruction buffer oriented parallel to the memory slice, and stores instructions at one or more predetermined addresses of one or more memory tiles of the memory slice.

* * * * *